US011331783B2

(12) United States Patent
Tanaka et al.

(10) Patent No.: US 11,331,783 B2
(45) Date of Patent: May 17, 2022

(54) COMMUNICATION ADAPTER ATTACHMENT DEVICE AND WORKING MACHINE

(71) Applicant: MAKITA CORPORATION, Anjo (JP)

(72) Inventors: Kazuya Tanaka, Anjo (JP); Hironori Ogura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/819,678

(22) Filed: Mar. 16, 2020

(65) Prior Publication Data

US 2020/0215676 A1 Jul. 9, 2020

Related U.S. Application Data

(63) Continuation of application No. 16/443,008, filed on Jun. 17, 2019, now Pat. No. 10,625,409, which is a
(Continued)

(30) Foreign Application Priority Data

Nov. 4, 2016 (JP) .............................. JP2016-216272

(51) Int. Cl.
*B25F 3/00* (2006.01)
*B25F 5/02* (2006.01)
(Continued)

(52) U.S. Cl.
CPC ................ *B25F 3/00* (2013.01); *B25F 5/001* (2013.01); *B25F 5/02* (2013.01); *B25F 5/021* (2013.01);
(Continued)

(58) Field of Classification Search
CPC .... B25F 3/00; B25F 5/001; B25F 5/02; B25F 5/021; H02J 50/80; H02J 7/0044;
(Continued)

(56) References Cited

U.S. PATENT DOCUMENTS 5,815,109 A 9/1998 Tan
6,731,201 B1 * 5/2004 Bailey ..................... H04L 29/06
340/12.32
(Continued)

FOREIGN PATENT DOCUMENTS

JP 2007-028206 A 2/2007
JP 2011-124886 A 6/2011
(Continued)

OTHER PUBLICATIONS

Jun. 15, 2018 Office Action issued in U.S. Appl. No. 15/790,478.
(Continued)

*Primary Examiner* — Franklin D Balseca
(74) *Attorney, Agent, or Firm* — Oliff PLC

(57) ABSTRACT

A communication adapter attachment device in one aspect of the present disclosure is provided in a working machine, and includes an adapter housing portion, a cap, and a cap-side interface. The cap-side interface is configured to enable viewing of the adapter-side interface and/or an input operation to the adapter-side interface from outside of the working machine, in a state in which the communication adapter is accommodated in the adapter housing portion and the opening is closed with the cap.

22 Claims, 19 Drawing Sheets

Related U.S. Application Data continuation of application No. 15/790,478, filed on Dec. 23, 2017, now Pat. No. 10,391,622.

(51) Int. Cl.
| | |
|---|---|
| *H02J 50/80* | (2016.01) |
| *B25F 5/00* | (2006.01) |
| *G05B 13/02* | (2006.01) |
| *H01M 50/256* | (2021.01) |
| *H04Q 9/00* | (2006.01) |
| *H01R 33/94* | (2006.01) |
| *H02J 7/00* | (2006.01) |

(52) U.S. Cl.
CPC ............ *G05B 13/024* (2013.01); *H02J 50/80* (2016.02); *H01M 50/256* (2021.01); *H01R 33/94* (2013.01); *H02J 7/0044* (2013.01); *H04Q 9/00* (2013.01); *H04Q 2209/00* (2013.01); *H04Q 2209/40* (2013.01)

(58) Field of Classification Search
CPC . G05B 13/024; H01M 2/1011; H01M 50/256; H01R 33/94; H04Q 9/00; H04Q 2209/00; H04Q 2209/40; H04Q 2209/80
See application file for complete search history.

(56) References Cited

U.S. PATENT DOCUMENTS

| | | | |
|---|---|---|---|
| 7,400,917 B2 | 7/2008 | Wood et al. | |
| 7,495,895 B2 | 2/2009 | Carnevali | |
| 8,953,815 B2 | 2/2015 | Shinozaki | |
| 9,033,744 B2* | 5/2015 | Chen ................... | H01R 12/721 |
| | | | 439/660 |
| 9,318,856 B2* | 4/2016 | MacDougall .......... | H01R 24/60 |
| 9,537,335 B2* | 1/2017 | Furui ........................ | B25F 3/00 |
| 9,858,231 B2* | 1/2018 | Roberts-Hoffman ........................ | |
| | | | G06F 13/382 |
| 2011/0142249 A1 | 6/2011 | Shinozaki | |
| 2014/0151079 A1 | 6/2014 | Furui et al. | |
| 2017/0208669 A1* | 7/2017 | Chung ................ | H05B 47/105 |

FOREIGN PATENT DOCUMENTS

| | | |
|---|---|---|
| JP | 2014-021538 A | 2/2014 |
| JP | 2014-525840 A | 10/2014 |
| JP | 2015-029962 A | 2/2015 |

OTHER PUBLICATIONS

Jul. 18, 2019 Office Action Issued in U.S. Appl. No. 16/443,008.
Aug. 4, 2020 Office Action issued in Japanese Patent Application No. 2016-216272.

* cited by examiner

FIG. 18
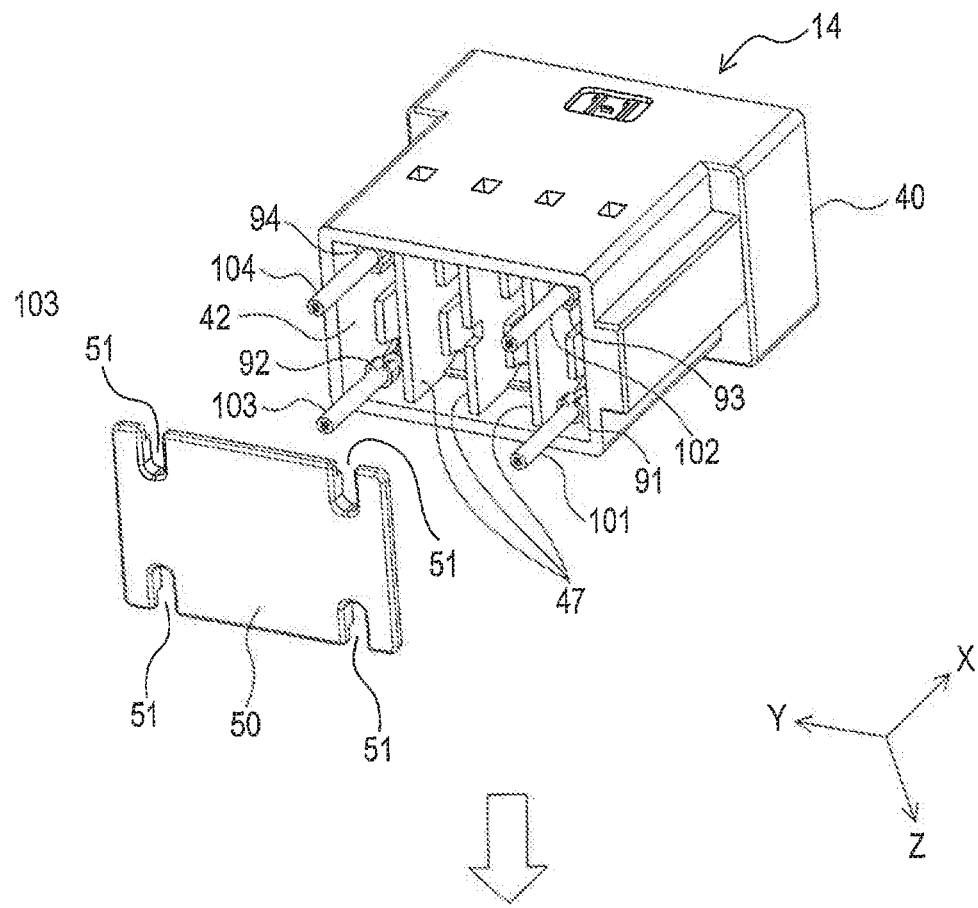
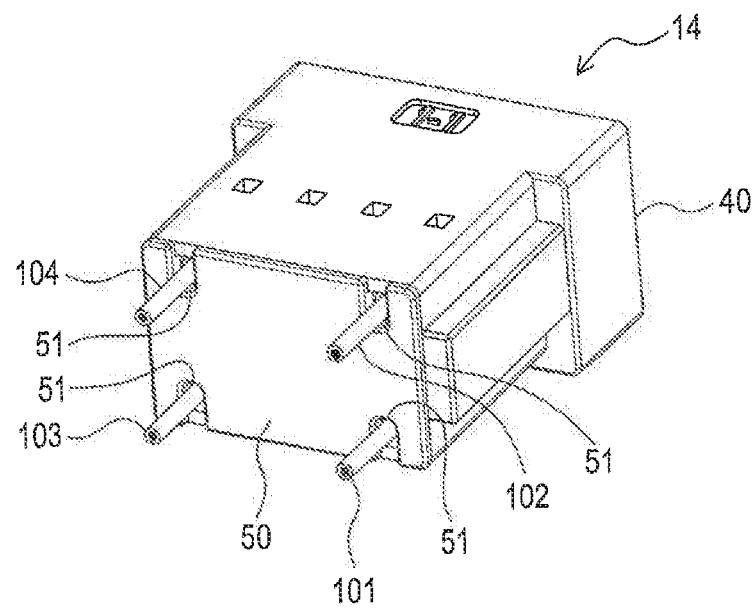

COMMUNICATION ADAPTER ATTACHMENT DEVICE AND WORKING MACHINE

CROSS-REFERENCE TO RELATED APPLICATIONS

This application is a Continuation of U.S. application Ser. No. 16/443,008 filed on Jun. 17, 2019, which is a Continuation of U.S. application Ser. No. 15/790,478 filed Oct. 23, 2017, and claims the benefit of Japanese Patent Application No. 2016-216272 filed on Nov. 4, 2016 with the Japan Patent Office, the disclosure of which is incorporated herein by reference.

BACKGROUND

The present disclosure relates to a technique for attaching and detaching a communication adapter to and from a working machine.

There are various electric working machines for milling, cutting, drilling, or performing other tasks on a workpiece. Among such working machines, devices are known to which an adapter that is wirelessly communicable with an external device can be attached.

Japanese Unexamined Patent Application Publication No. 2014-525840 discloses a technique in which an adapter for wireless communication is attached to a main body of an electric power tool (tool main body), and various information such as remaining energy of the battery and an operating state of the electric power tool is wirelessly transmitted from the adapter to an external device. Further, in the above publication, an adapter provided with a display and with a switch is disclosed. This adapter is configured to expose the display and the switch to outside when attached to the tool main body. Therefore, a user can view display contents on the display of the adapter, or can operate the switch of the adapter.

As in the technique disclosed in the above publication, if an adapter is configured to be exposed to outside while being attached to the tool main body, foreign matter such as dust and water can enter the tool main body from a side of the tool main body in contact with the adapter. If foreign matter enters into the electric power tool, the electric power tool may malfunction or stop operation due to the entered foreign matter.

Also, the display and the switch of the adapter, because exposed to the outside, are likely to bump into other objects or be affected by foreign matter such as dust and water. Therefore, the display and the switch of the adapter are easy to damage.

In one aspect of the present disclosure, it is desirable that entering of foreign matter such as dust and water into a working machine and an adapter can be inhibited or avoided, and a user can access the adapter, in a state in which the adapter is attached to the working machine, while stable attachment of the adapter to the working machine is enabled.

One aspect of the present disclosure provides a communication adapter attachment device provided in a working machine. The communication adaptor attachment device includes a communication adapter, an adapter housing portion, and a cap. The communication adapter includes a first protrusion protruding from a first side, a second protrusion protruding from a second side, the second side located opposite to the first side, a connector engaging protrusion, and an adapter-side interface, and is configured to wirelessly communicate data with an external device. The adapter housing portion includes an opening through which the communication adapter is attached and detached, and a claw portion configured to engage the connector engaging protrusion, and is configured to receive the communication adapter. The cap includes a first engagement portion and a second engagement portion configured to engage the first protrusion and the second protrusion respectively, and a cap-side interface. The cap-side interface is configured to enable viewing of the adapter-side interface and/or an input operation to the adapter-side interface from outside of the working machine, in a state in which the communication adapter is accommodated in the adapter housing portion and that the opening is closed with the cap.

The cap may be configured to operate in multiple positions. The multiple positions include a closed position, a slightly open position, a fully open position, and a maximum open position. The closed position is a position where the cap presses the communication adaptor such that the communication adaptor is pressed into the adapter housing portion. The slightly open position is a position where the cap tilts slightly open on one side while the first and second engagement portions pull on the first and second protrusions respectively. The fully open position is a position where all sides of the cap are moved above the adapter housing portion, the connector engaging portion is disengaged from the claw portion, and the communication adapter is unconnected from a connector of the adapter housing portion. The maximum open position is a position wherein the first and second engagement portions are moved outside of the adapter housing portion and a fold back portion of a strap of the cap contacts an edge of a strap insertion opening of the adapter housing, such that the strap retains the cap to the adapter housing portion.

The communication adapter may further include an adapter case, a module substrate, and a case cover. The module substrate includes a controller, a light emitting diode (LED), an adapter switch, insertion pieces, and contacts on the insertion pieces. The case cover includes a substrate insertion hole sized to receive the insertion pieces, and is sized to fit a first end of the adapter case. The adapter-side interface may include an input/output end face and a switch label. The input/output end face includes a switch operation piece located over the adapter switch, a first LED window located over the LED, and a first support shaft holding the switch operation piece, and is sized to fit a second end of the adapter case. The switch label includes a switch button located over the switch operation piece, and a second LED window located over the first LED window, and is sized to fit on the input/output end face.

The cap may further include a cap body, an O-ring around a perimeter of the cap body, and a tab. The cap-side interface may include a third LED window, a button operation piece, a second support shaft, and a display label. The third LED window is located above the second LED window. The button operation piece is located above the switch button. The second support shaft holds the button operation piece. The display label includes a fourth LED window located above the third LED window, and a cap button located above the button operation piece, and is configured to fit on the cap body.

Another aspect of the present disclosure provides a communication adapter attachment device that is provided in a working machine and to which a communication adapter is detachably attached. The communication adapter includes an adapter-side interface and wirelessly communicates data with an external device. The adapter-side interface enables an output of information to outside of the communication adapter and/or an input operation to the communication adapter.

The communication adapter attachment device includes an adapter housing portion, a cap, and a cap-side interface. The adapter housing portion is provided inside the working machine, has an opening provided on an outer surface of the working machine, and accommodates the communication adapter that is detachable through the opening. The cap is configured to close the opening. The cap-side interface is provided in the cap. The cap-side interface is configured to enable viewing of the adapter-side interface and/or an input operation to the adapter-side interface from outside of the working machine, in a state in which the communication adapter is accommodated in the adapter housing portion and the opening is closed with the cap.

According to the configuration as such, the adapter housing portion in which the communication adapter is accommodated can be sealed with the cap. Therefore, in a state in which the communication adapter is attached to the working machine, entering of foreign matter such as dust and water into the working machine and the communication adapter can be inhibited or avoided while stable attachment of the communication adapter to the working machine is enabled. Further, even in a state in which the adapter housing portion is sealed with the cap, a user can indirectly access the adapter-side interface via the cap-side interface. In other words, in a state in which the adapter housing portion is sealed with the cap, a user can access the communication adapter.

The adapter-side interface may include a display for displaying the information. The cap-side interface may have a window. The window may be provided at a position corresponding to the display of the communication adapter accommodated in the adapter housing portion and may be configured to enable viewing of the information displayed on the display.

According to the configuration as such, a user of the working machine, even in a state in which the adapter housing portion is sealed with the cap, can view the display of the communication adapter accommodated in the adapter housing portion through the window.

The adapter-side interface may include an adapter-side operating portion that can be depressed. The cap-side interface may include a cap-side operating portion. The cap-side operating portion is provided at a position corresponding to the adapter-side operating portion of the communication adapter accommodated in the adapter housing portion. The cap-side operating portion is configured to be able to depress the adapter-side operating portion by depressing the cap-side operating portion from outside.

According to the configuration as such, a user of the working machine, even in a state in which the adapter housing portion is sealed with the cap, can indirectly depress the adapter-side interface of the communication adapter accommodated in the adapter housing portion by depressing the cap-side operating portion.

The communication adapter may include a protrusion on a side surface. The cap may be configured to be rotatable between a closed position and an open position about one end of the cap positioned in the closed position. The closed position is a position where the opening is closed. The open position is a position where the opening is open. The cap may include an engaging portion. The engaging portion may extend into the adapter housing portion and engage with the protrusion in a state in which the cap is positioned in the closed position. The engaging portion may be configured to move with the cap in engagement with the protrusion, in case that the cap is rotated to the open position from the closed position.

According to the configuration as such, when the cap is rotated to the open position from the closed position, it is possible to move the communication adapter to the opening side from inside of the adapter housing portion to take out the communication adapter. In other words, it is no longer necessary for a user to grab the communication adapter to pull it out from the adapter housing portion after moving the cap to the open position. That is, the user, if moving the cap to the open position, can take out the communication adapter easily and efficiently.

In case, for example, that the communication adapter attachment device is configured such that the communication adapter is grabbed with fingers to be pulled out from the adapter housing, the opening must have a space into which the communication adapter and the fingers can enter. Therefore, it is necessary to make the opening larger than the opening in one aspect of the present disclosure. However, locations on an outer surface of the working machine where such a large opening can be placed are limited. Furthermore, if the communication adapter attachment device is configured such that the communication adapter is pulled out from the adapter housing portion using a tool with a thin tip such as, for example, a precision screwdriver, it is possible to inhibit the opening from becoming large. However, it becomes necessary for the user to prepare the tool to work with every time the communication adapter is pulled out from the adapter housing portion, and thus it is time-consuming.

In contrast, according to the above configuration, it is possible to inhibit the opening from becoming large, and the user can easily take out the communication adapter from the adapter housing portion with less effort. Further, according to the configuration in one aspect of the present disclosure, the opening can be configured relatively small as compared with the configuration in which the communication adapter is directly grabbed and taken out with fingers. Thus, the degree of freedom increases in arrangement of the opening on the outer surface of the working machine.

The cap may be provided with an elongated strap. A fold-back portion may be formed at a distal end of the strap. Further, the adapter housing portion may have a strap insertion opening to which the strap can be inserted. Removal of the strap from the strap insertion opening, in case that the strap is inserted to the strap insertion opening, may be restricted by the fold-back portion.

According to the configuration as such, in case that the strap of the cap is inserted to the strap insertion opening, the fold-back portion is caught on the strap insertion opening even if an attempt is made to pull out the strap from the strap insertion opening. Therefore, the strap is not easily pulled out of the strap insertion opening. In other words, removal of the cap from the working machine can be inhibited. Therefore, it is possible to inhibit loss of the cap.

The adapter housing portion may include a connector coupled to a controller of the working machine. The communication adapter may be attached to the connector, and electrically coupled to the controller via the connector.

According to the configuration as such, an operating state of the working machine can be transmitted to an external device by wireless communication. As a result, the external device can work with the working machine.

The connector may include a claw portion having a semicircular annular shape formed on its side surface. The adapter may include a connector engaging protrusion formed on its side surface. The claw portion may be configured to engage the connector engaging protrusion when the communication adapter is attached to the connector, and to be elastically deformed to release the engagement with the connector engaging protrusion in case that the engaging portion moves with the cap.

According to the configuration as such, in case that the communication adapter is attached to the connector, the claw portion engages the connector engaging protrusion and the communication adapter is held by the connector, so that the communication adapter is inhibited from coming out of the connector due to vibration or the like. Also, in case that the cap is rotated from the closed position to the open position, the communication adapter moves with the cap. Along with the movement of the communication adapter, the claw portion is elastically deformed, so that the engagement between the claw portion and the connector engaging protrusion is released. Therefore, when the cap is rotated from the closed position to the open position, the communication adapter can be detached from the connector.

The working machine may be an electric working machine.

Still another aspect of the present disclosure provides a working machine provided with a communication adapter attachment device to which a communication adapter is detachably attached. The communication adapter includes an adapter-side interface and wirelessly communicates data with an external device. The adapter-side interface enables an output of information to outside of the communication adapter and/or an input operation to the communication adapter.

The communication adapter attachment device includes an adapter housing portion, a cap, and a cap-side interface. The adapter housing portion is provided inside the working machine, has an opening on an outer surface of the working machine, and accommodates the communication adapter that is detachable through the opening. The cap is configured to close the opening. The cap-side interface is provided in the cap. The cap-side interface is configured to enable viewing of the adapter-side interface and/or an input operation to the adapter-side interface from outside of the working machine, in a state in which the communication adapter is accommodated in the adapter housing portion and the opening is closed with the cap.

Thus, the working machine having the above configuration can exhibit the same effects as the aforementioned communication adapter attachment device.

BRIEF DESCRIPTION OF THE DRAWINGS

An example embodiment of the present disclosure will be described hereinafter with reference to the accompanying drawings, in which:

FIG. 18 is a perspective view of the connector as seen from bottom; and

DETAILED DESCRIPTION OF THE PREFERRED EMBODIMENTS

1. Embodiment (1-1) Overall Configuration of Electric Working Machine

Figure 1:
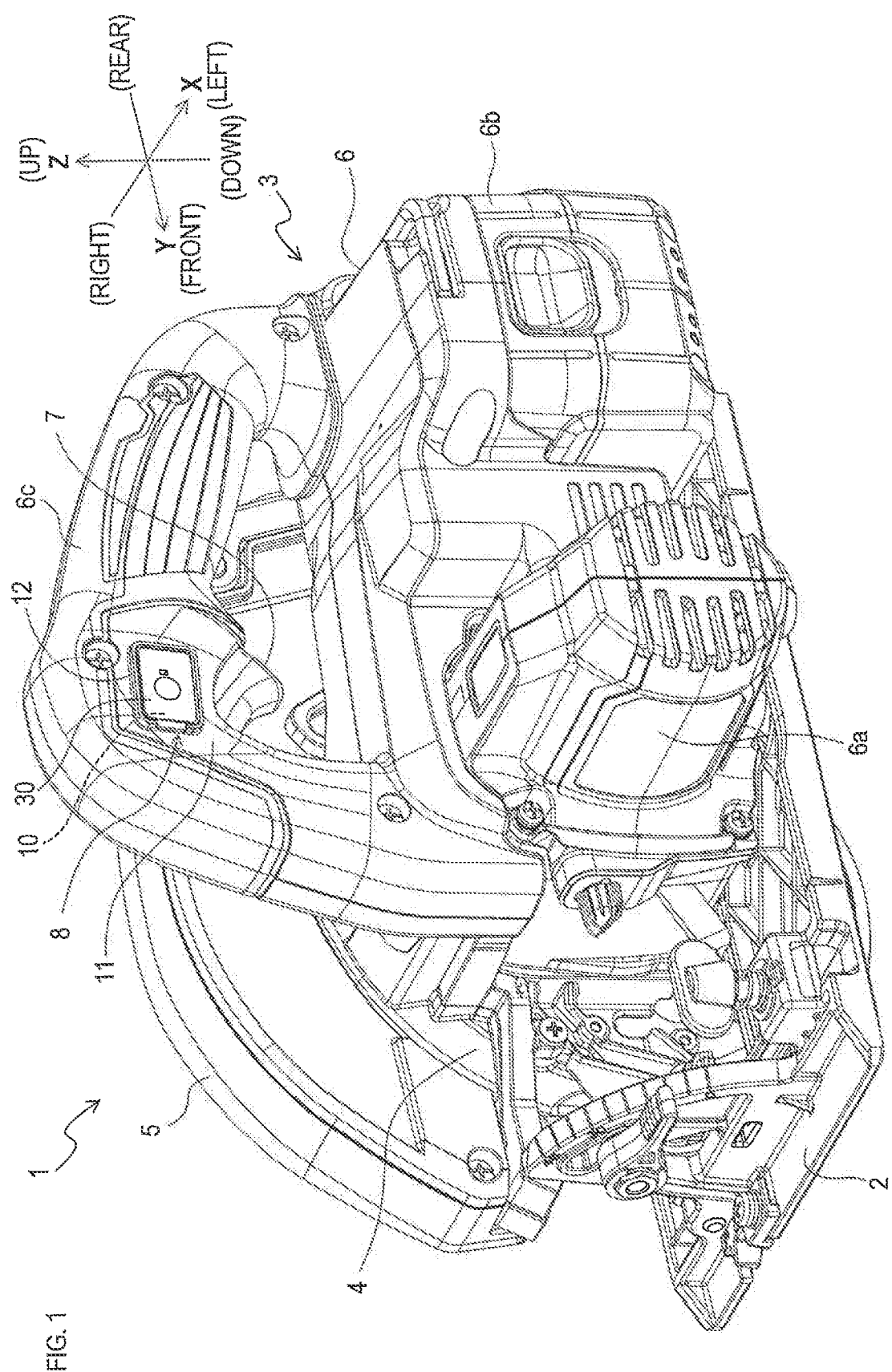
FIG. 1 is a perspective view of an electric working machine of an embodiment.

As shown in FIG. 1, an electric working machine 1 of the present example embodiment is configured as a circular saw mainly used to cut a workpiece. The electric working machine 1 includes a base 2 and a main body 3. The base 2 is a substantially rectangular member which is brought into contact with top of a workpiece to be cut. The main body 3 is disposed on a top side of the base 2. As shown in FIG. 1, three axes of X, Y, Z, and front, rear, up, down, left and right directions are defined for the electric working machine 1.

The main body 3 includes a circular saw blade 4, a saw blade casing 5, and a main body housing 6. The saw blade 4 is disposed on the right side in the main body 3. The saw blade casing 5 covers substantially a half of a circumference of the saw blade 4 at an upper side of the saw blade 4, to accommodate an upper part of the saw blade 4 therein.

The main body housing 6 is disposed on the left side in the main body 3. The main body housing 6 includes a substantially cylindrical motor housing portion 6a, a controller housing portion 6b, and a handle portion 6c.

Figure 2:
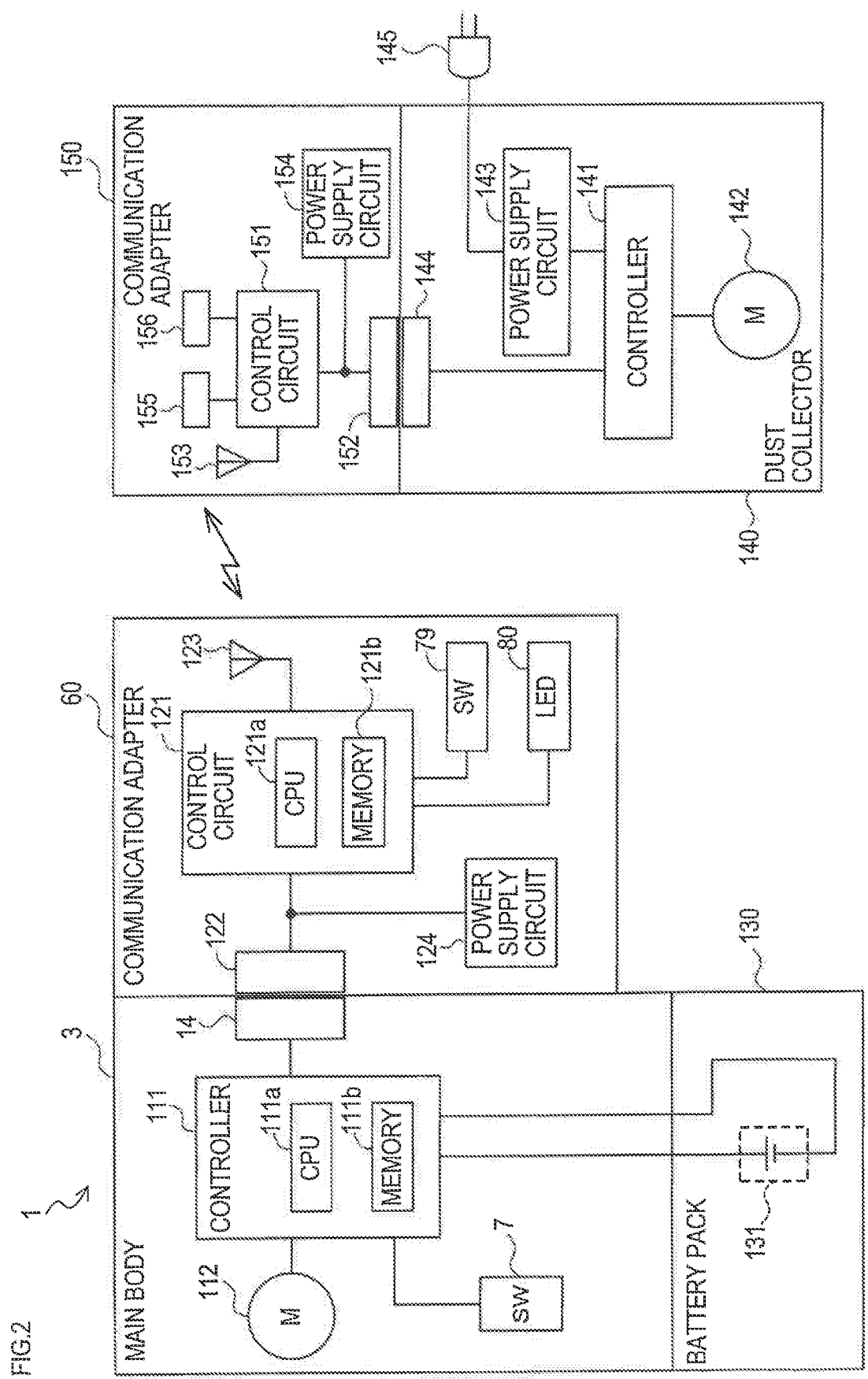
FIG. 2 is a block diagram showing an electrical configuration of the electric working machine and a dust collector of the embodiment.

As shown in FIG. 2, the motor housing portion 6a accommodates a motor 112 for rotating the saw blade 4. Further, the controller housing portion 6b accommodates a controller 111 for controlling driving of the motor 112. Both the motor 112 and the controller 111 are not shown in FIG. 1.

A gear mechanism (not shown) is accommodated between the motor housing portion 6a and the saw blade 4 in the main body 3. The gear mechanism reduces rotation of the motor 112 and transmits the reduced rotation to the saw blade 4. The handle portion 6c is a portion to be gripped by a user of the electric working machine 1, and is located upon using the electric working machine 1. The handle portion 6c is formed in an arch shape. In the present embodiment, the motor housing portion 6a, the controller housing portion 6b, and the handle portion 6c are integrally formed, for example, from a resin material.

As shown in FIG. 1, the handle portion 6c includes an operation switch 7, which is a trigger. The user of the electric working machine 1 can turn on the operation switch 7 while gripping the handle portion 6c, thereby causing the saw blade 4 to rotate.

An adapter attachment portion 8 is provided inside the handle portion 6c. The adapter attachment portion 8 includes a communication adapter 60 shown in FIG. 3. The adapter attachment portion 8 is an example of an adapter attachment device. The communication adapter 60 is not shown in FIG. 1. The adapter attachment portion 8 also includes an adapter housing portion 10 in which the communication adapter 60 is accommodated. The adapter housing portion 10 is located in an internal space of the handle portion 6c.

In addition, the adapter housing portion 10 has an adapter insertion opening 12 which is opened for inserting/removing the communication adapter 60 to/from the adapter housing portion 10. The adapter insertion opening 12 is formed on a left side surface of the handle portion 6c on a housing outer surface 11. The adapter insertion opening 12 is configured so that the communication adapter 60 can be inserted to and removed from the adapter housing portion 10 in a left and right direction.

Further, the adapter attachment portion 8 includes a cap 30 for closing the adapter insertion opening 12. The cap 30 is configured to be rotatable between a closed position and an open position about one end portion of the cap 30 located at the closed position. The closed position is a position to close the adapter insertion opening 12. The open position is the position to open the adapter insertion opening 12. In this embodiment, the end portion of the cap 30 serving as a rotation axis is an end portion on the front side of the cap 30 along a Z axis. Hereinafter, a state in which the cap 30 is in the closed position is referred to as a closed state, and a state in which the cap 30 is in the open position is referred to as an open state.

The cap 30 is provided to close the adapter insertion opening 12 thereby to inhibit dust and water from entering the adapter insertion opening 12 of the adapter housing portion 10. Attachment and detachment of the communication adapter 60 is performed with the cap 30 opened. When the communication adapter 60 is fully inserted to the adapter housing portion 10, the cap 30 can be closed.

FIG. 1 shows a state in which the cap 30 is closed. In the state in which the cap 30 is closed, a surface of the cap 30 is located on substantially the same plane as the housing outer surface 11.

(1-2) Electrical Configuration of Electric Working Machine and Dust Collector

An electrical configuration of the electric working machine 1 will be described with reference to FIG. 2. In FIG. 2, the electric working machine 1, and a dust collector 140 configured to be able to work with the electric working machine 1, are shown together. Interlocking operation between the electric working machine 1 and the dust collector 140 is implemented based on wireless data communication between the communication adapter 60 attached to the electric working machine 1 and a communication adapter 150 attached to the dust collector 140. By operating the dust collector 140 in conjunction with the electric working machine 1, dust and shavings generated by use of the electric working machine 1 can be sucked into the dust collector 140.

The electric working machine 1 includes the main body 3, a battery pack 130, and the communication adapter 60. The battery pack 130 is attachable to and detachable from the main body 3. As described above, the communication adapter 60 can also be attached to and detached from the adapter housing portion 10 provided in the main body 3.

The battery pack 130 includes a battery 131 that is repeatedly rechargeable. Each part of the main body 3 receives electric power from the battery 131 to operate. The battery 131 of the present embodiment is, for example, a lithium ion rechargeable battery. The battery 131 may be another rechargeable battery other than the lithium-ion rechargeable battery. By removing the battery pack 130 from the electric working machine 1 and attaching the battery pack 130 to a charger, the internal battery 131 is charged.

The battery 131 may be incorporated in the main body 3. In that case, the battery 131 may be configured to be charged by connecting a charging cable to the main body 3. Also, the battery 131 may be configured to be charged by taking out the battery 131 from the main body 3. It is merely an example that the electric working machine 1 is powered by the battery 131. The electric working machine 1 may be configured to be operable by receiving electric power directly from a power source other than the battery 131. For example, the electric working machine 1 may be configured to receive alternating current (AC) power from an outlet of an AC power source such as a commercial power source via a power cord, and operate with the AC power. Further, for example, the electric working machine 1 may be configured to be able to receive both direct current (DC) power from the battery 131 and AC power from an external power source, and generate electric power for driving the motor 112 from one or both of the powers to drive the motor 112.

The main body 3 includes the controller 111, the motor 112, the operation switch 7, and the connector 14. The operation switch 7 is also shown in FIG. 1. The controller 111, when the operation switch 7 is turned on, drives the motor 112 and outputs operating information and operating power for the communication adapter 60 to the communication adapter 60 via the connector 14. Thus, an interlocking command is wirelessly transmitted from the communication adapter 60 to the communication adapter 150 of the dust collector 140, and the dust collector 140 is driven in conjunction with the electric working machine 1. The operating information is information indicating that the operation switch 7 is turned on and the motor 112 is in operation. The interlocking command is a command for causing the dust collector 140 to operate in conjunction with the electric working machine 1.

The controller 111 includes a CPU 111a and a memory 111b. The memory 111b may include a RAM, a ROM, and a semiconductor memory such as a flash memory. The memory 111b stores various programs and data for implementing various functions of the electric working machine 1. The various functions of the electric working machine 1 are implemented by the CPU 111 executing the various programs stored in the memory 111b.

The various functions implemented by the controller 111 are not limited to software processing as described above. Some or all of the functions may be implemented using a hardware that incorporates a logic circuit, an analog circuit, and the like.

The connector 14 is a connecting circuit for electrically coupling the main body 3 and the communication adapter 60.

The communication adapter 60 includes a control circuit 121, a connection terminal 122, an antenna 123, a power supply circuit 124, an adapter switch 79, and a LED 80 (see FIG. 2).

Figure 5:
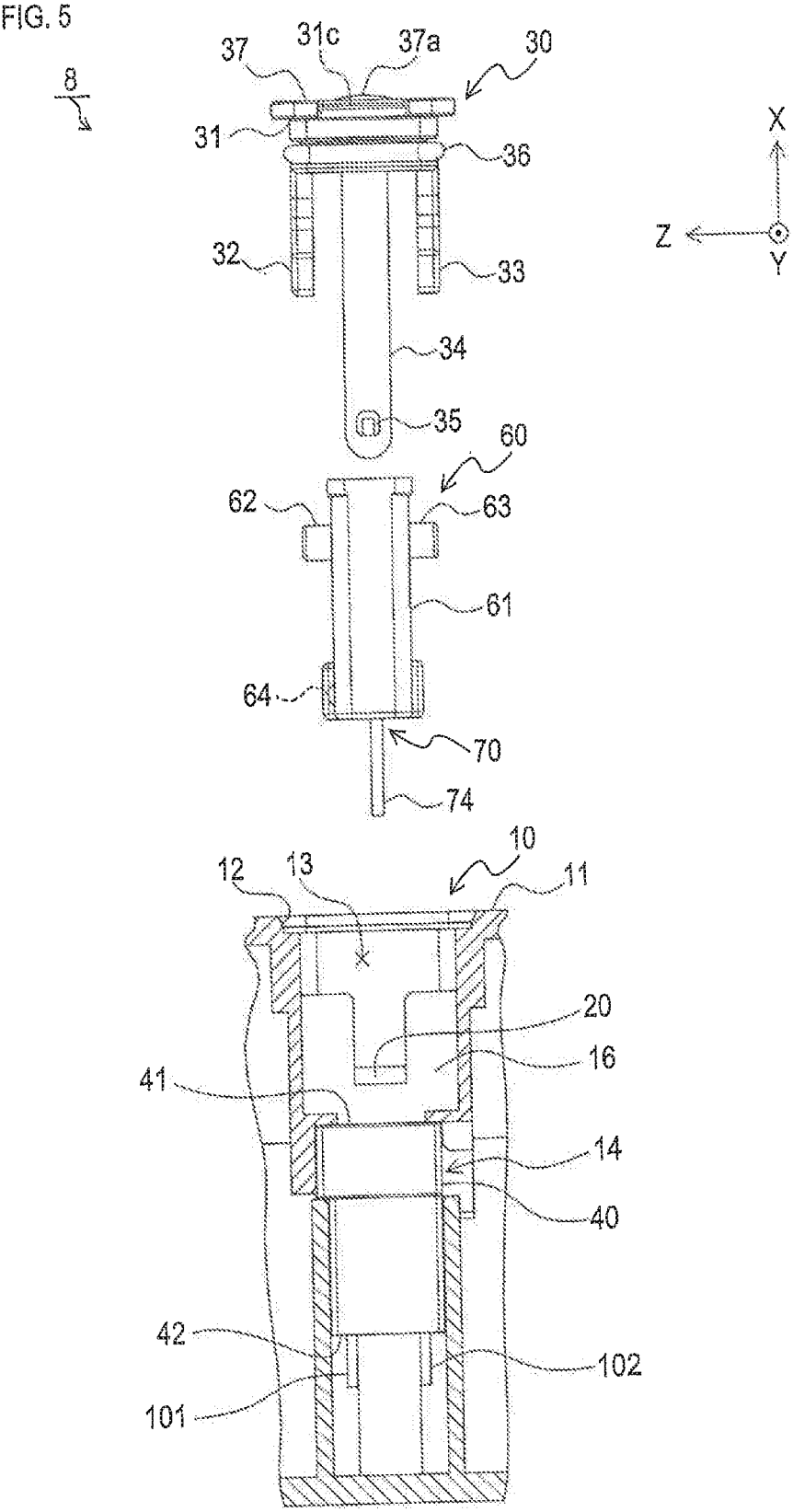
FIG. 5 is a view of the adapter attachment portion, the communication adapter and the cap of the embodiment, as seen from a cross-sectional direction along a line V-V in FIG. 3.
Figure 6:
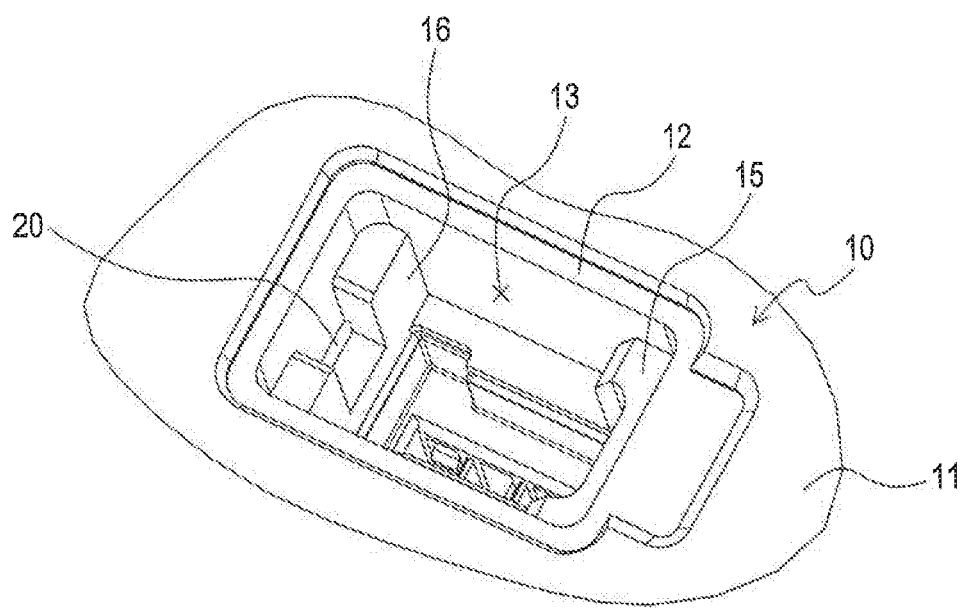
FIG. 6 is a perspective view of the adapter attachment portion from which the cap is removed, as seen from outside of the electric working machine.

The connection terminal 122 is a member for electrically coupling the communication adapter 60 and the main body 3, and corresponds with insertion piece 71-74 in FIG. 5.

When the operating information is output from the controller 111, the operating information is input to the connection terminal 122 of the communication adapter 60 via the connector 14, and then input to the control circuit 121 via the connection terminal 122. When the operating power for the communication adapter 60 is output from the controller 111 via the connector 14, the operating power is input to the power supply circuit 124 via the connection terminal 122.

When the operating power is input from the main body 3 via the connection terminal 122, the power supply circuit 124 generates an internal source power for operating each part of the communication adapter 60, including the control circuit 121, and supplies the generated internal source power to each part.

The control circuit 121 includes a CPU 121a and a memory 121b. The memory 121b may include a semiconductor memory such as a RAM, a ROM, a flash memory, or the like. The memory 121b stores various programs and data for implementing various functions of the communication adapter 60. The various functions of the communication adapter 60 are implemented by the CPU 121a executing the various programs stored in the memory 121b. The various functions implemented by the control circuit 121 are not limited to software processing. Some or all of the functions may be implemented by using a hardware that incorporates a logic circuit, an analog circuit, and the like.

When the operating information is input from the main body 3 via the connection terminal 122, the control circuit 121 wirelessly transmits information (based on the operating information) from the antenna 123. The information (based on the operating information) includes the above-mentioned interlocking command. When the interlocking command wirelessly transmitted from the communication adapter 60 is received by the communication adapter 150, the interlocking command is transmitted to the dust collector 140. As a result, the dust collector 140 is operated in conjunction with the electric working machine 1.

When the operation switch 7 is turned off and the motor 112 stops, an interlock stop command is wirelessly transmitted from the communication adapter 60. As a result, the interlocking operation of the dust collector 140 is also stopped.

The dust collector 140 can suck dust and shavings discharged by the operation of the electric working machine 1 via a not shown dust collecting hose. Further, the communication adapter 150 is attachable to and detachable from the dust collector 140.

The dust collector 140 includes a controller 141, a motor 142, a power supply circuit 143, a connector 144, and an outlet 145. The motor 142 is provided to drive a suction fan (not shown). The power supply circuit 143 receives AC power supplied from a commercial power supply (not shown) via the outlet 145 and generates a source power for operating each part of the dust collector 140 based on the AC power.

It is merely an example that the external power supplied to the dust collector 140 is AC power. For example, the dust collector 140 may be configured to include a detachable battery pack as in the electric working machine 1, or to include a built-in battery, so that the dust collector 140 is operable with DC power from the battery. Further, for example, the dust collector 140 may be configured to be able to receive both DC power from the battery and AC power from an external power supply, and generate electric power for driving the motor 142 from one or both of the powers so as to drive the motor 142.

The motor 112 and the motor 142 of the dust collector 140 are not particularly limited to a specific type of motor. The type of each motor may be determined as appropriate, for example, in accordance with such as models of the electric working machine 1 and the dust collector 140, and intended use. For example, the motor 112 and the motor 142 may use a brush DC motor or a brushless motor. Other motors may be used.

The controller 141, like the controller 111 of the electric working machine 1, includes a CPU and a memory, and implements various functions of the dust collector 140. When an operation switch (not shown) is turned on by a user of the dust collector 140, the controller 141 causes the motor 142 to drive, and brings the dust collector 140 into a state in which dust and shavings can be sucked. The connector 144 is a connection circuit for electrically coupling the communication adapter 150 and the dust collector 140, and is configured in the same manner as the connector 14 of the electric working machine 1.

The communication adapter 150 that is detachable from the dust collector 140 is configured basically the same as the communication adapter 60 that is detachable from the electric working machine 1, and has the same functions as those of the communication adapter 60. In other words, the communication adapter 150 includes, similar to the communication adapter 60, a control circuit 151, a connection terminal 152, an antenna 153, a power supply circuit 154, an adapter switch 155, and a LED 156.

The communication adapter 150, when receiving the interlocking command from the communication adapter 60, outputs the received interlocking command to the dust collector 140 via the connection terminal 152. The controller 141, when receiving the interlocking command via the connector 144, drives the motor 142. Thereafter, the controller 141, when receiving the interlock stop command from the communication adapter 150 via the connector 144, stops the motor 142. Thus, an interlocking operation of the electric working machine 1 and the dust collector 140 is implemented.

Timing to stop the motor 142 when the interlock stop command is received from the communication adapter 150 may be determined. For example, the controller 141 may stop the motor 142 immediately after receiving the interlock stop command.

Further, for example, the controller 141 after receiving the interlock stop command, may wait for a specified time and then stop the motor 142. In other words, the controller 141, after the motor 112 stops, may continuously drive the motor 142 for the specified time. The same effect as this can also be implemented by the following configuration. That is, when the operation switch 7 of the electric working machine 1 is turned off, the controller 111 may stop the motor 112 but may not immediately transmit the interlock stop command, and transmit the interlock stop command to the communication adapter 60 after elapse of the specified time.

Also, when the operation switch 7 of the electric working machine 1 is turned on, the controller 111 may transmit the interlocking command to the dust collector 140 via the communication adapter 60 but may not drive the motor 112 immediately, and may drive the motor 112 after elapse of the specified time after the interlocking command is transmitted. In other words, the motor 142 of the dust collector 140 may be driven first, and thereafter the motor 112 of the electric working machine 1 may be driven.

The dust collector 140 of the present embodiment is configured such that the communication adapter 150 is detachable. However, the communication adapter 150 or a circuit module equivalent to the communication adapter 150 may be incorporated in advance.

For interlocking operation of the electric working machine 1 and the dust collector 140, it is necessary that the communication adapter 60 of the electric working machine 1 and the communication adapter 150 of the dust collector 140 can perform one-to-one wireless communication with each other in advance. In other words, it is necessary to pair the communication adapter 60 with the communication adapter 150.

In order to pair both the communication adapters with each other, the adapter switch 79 is provided in the communication adapter 60 and the adapter switch 155 is also provided in the communication adapter 150. Specifically, the pairing is performed as follows. First, the adapter switch 155 is turned on by a user, so that the communication adapter 150 is brought into a pairing standby state. Thereafter, the adapter switch 79 is turned on by a user, so that specified data communication for pairing is performed between the two communication adapters. As a result, the pairing of the two communication adapters is completed.

When the pairing of the two communication adapters is completed, one-to-one data communication is enabled between the two communication adapters. When the interlocking command is wirelessly transmitted from the communication adapter 60 of the electric working machine 1, and the interlocking command is received by the communication adapter 150 of the dust collector 140, the dust collector 140 is driven in conjunction with the electric working machine 1 based on the interlocking command. Functions of each of the communication adapters 60, 150 are not limited to transmission and reception of the pairing and interlocking commands. Transmission and reception of various other information can be also made.

The communication adapter 60 of the electric working machine 1 is configured to turn off, turn on or blink the LED 80 in accordance with an operating state of the communication adapter 60. Further, it is possible to switch emission colors at the time of turning on or blinking the LED 80 to any one of a plurality of colors. Further, it is possible to switch time intervals or blinking patterns when blinking the LED 80 to any one of a plurality of types of intervals or patterns.

In the present embodiment, for example, when the communication adapter 60 is attached to the adapter attachment portion 8 of the electric working machine 1 and the communication adapter 60 is started with a source power supplied to the communication adapter 60, the LED 80 is lit in a specific color. Further, for example, when the adapter switch 79 is turned on during startup of the communication adapter 60 and specified data communication for pairing is started, the LED 80 blinks while the data communication is performed, i.e., during pairing execution. Further, for example, when the pairing is complete, the LED 80 blinks at a faster rate than the blink rate during pairing execution. The user, by viewing an emission state of the LED 80, can understand the operating state of the communication adapter 60. The same applies to the communication adapter 150 of the dust collector 140. The LED 156 is turned off, turned on or blinks in accordance with the operating state of the communication adapter 150.

(1-3) Structure of Adapter Attachment Portion

Figure 3:
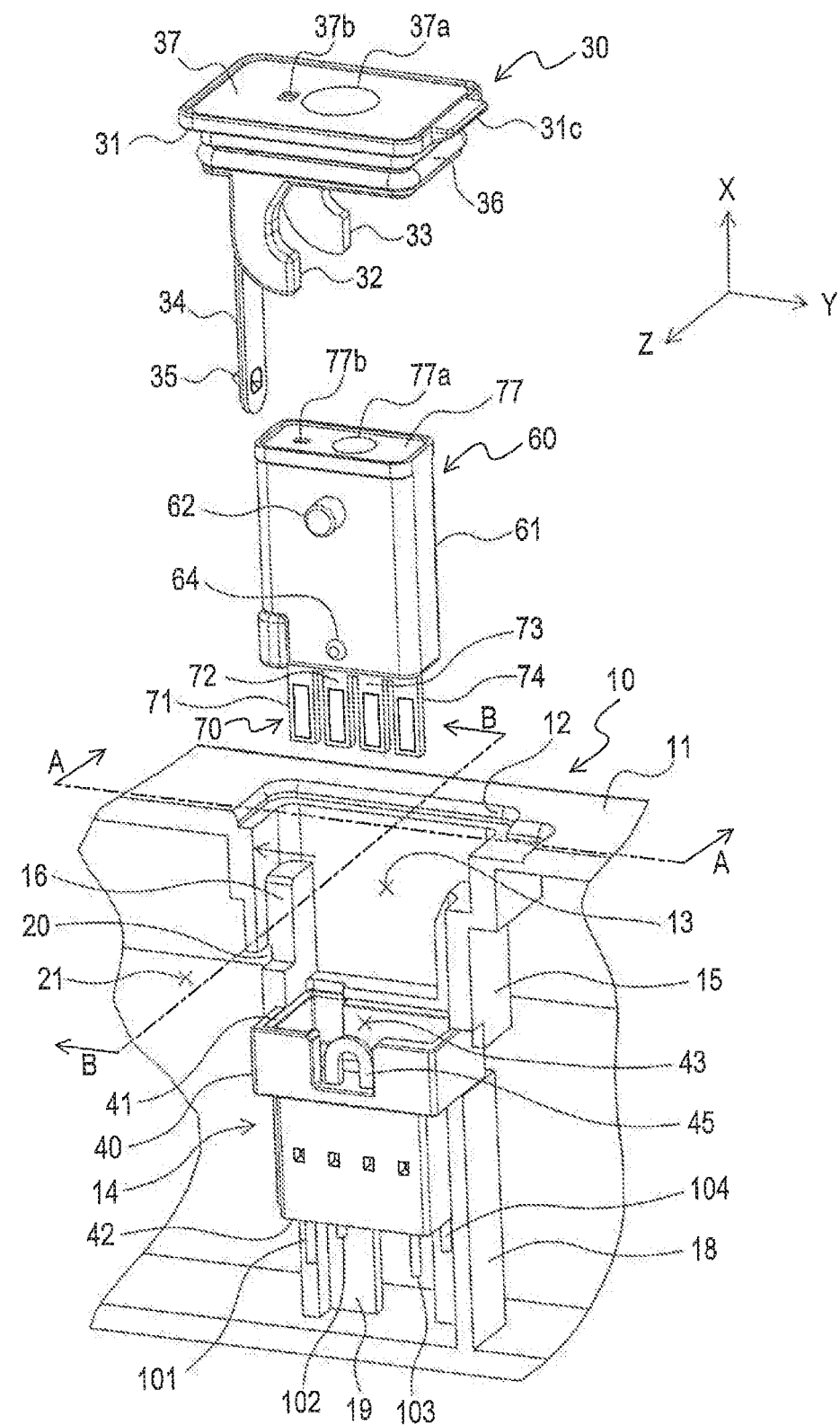
FIG. 3 is a perspective view showing a configuration of an adapter attachment portion, a communication adapter and a cap of the embodiment.
Figure 4:
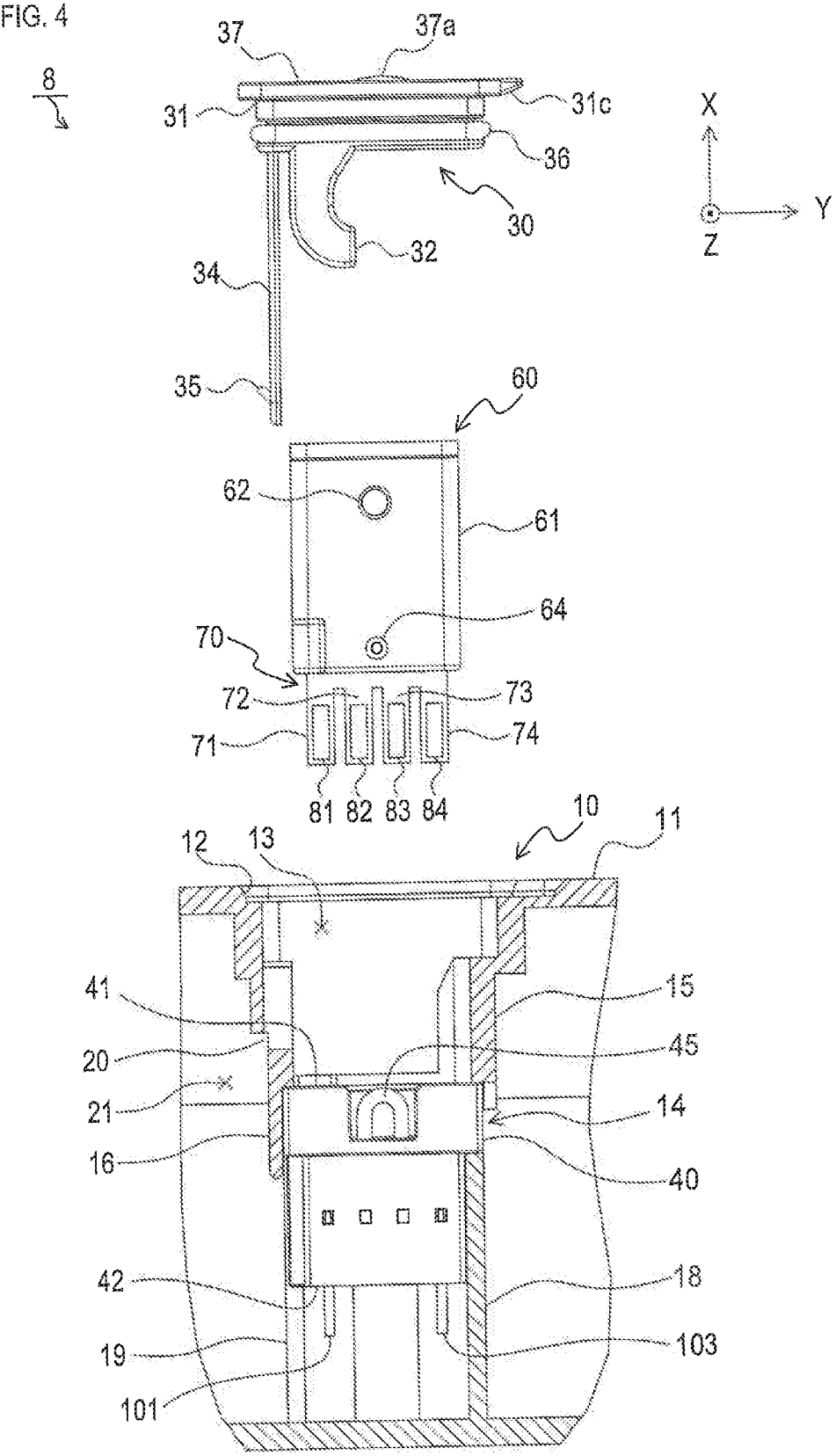
FIG. 4 is a view of the adapter attachment portion, the communication adapter and the cap of the embodiment, as seen from a cross-sectional direction along a line IV-IV in FIG. 3.

A specific structure of the adapter attachment portion 8 will be described mainly with reference to FIG. 3, and FIGS. 4 to 6. In FIG. 3, the adapter housing portion 10 is shown divided into halves on an XY plane. FIG. 4 is a view as seen from a cross-sectional direction along a line IV-IV in FIG. 3. FIG. 4 shows a cross section of the adapter housing portion 10, and the front of the connector 14, the cap 30, and the communication adapter 60. FIG. 5 is a view as seen from a cross-sectional direction along a line V-V in FIG. 3. FIG. 5 shows a cross section of the adapter housing portion 10, and the side of the connector 14, the cap 30, and the communication adapter 60.

As shown in FIGS. 3 to 5, the adapter attachment portion 8 includes the adapter housing portion 10 and the cap 30. The adapter housing portion 10 is provided with the connector 14.

As shown in FIGS. 3 to 6, the adapter housing portion 10 is provided inside the main body housing 6 and has the adapter insertion opening 12 through which the communication adapter 60 is inserted to the adapter housing portion 10. The adapter insertion opening 12 is formed by opening a part of the housing outer surface 11 of the main body housing 6 in a substantially rectangular shape.

The adapter housing portion 10 has a main body-side housing space 13 for disposing the connector 14 and the communication adapter 60. As shown in FIGS. 3 to 5, the connector 14 is provided in a region on the inner side of the main body 3 by a certain length from the adapter insertion opening 12 in the main body-side housing space 13.

The connector 14 includes a connector housing 40. The connector 14 is supported mainly by four ribs 15, 16, 18, 19 provided in the main body housing 6. Specifically, the connector housing 40 is held to be fixed between the upper first rib 15 and the upper second rib 16, and the lower first rib 18 and the lower second rib 19, in an X-axis direction.

The upper first rib 15 and the upper second rib 16 restrict movement of the connector 14 to the adapter insertion opening 12 side, and inhibit the connector 14 from coming out of the adapter insertion opening 12. Further, the lower first rib 18 and the lower second rib 19 inhibit overall lateral (Y-axis and Z-axis directions) vibration of the connector 14.

An adapter insertion opening 41 through which the communication adapter 60 is inserted is formed on top side of the connector housing 40, i.e., on the adapter insertion opening 12 side in FIG. 3. The communication adapter 60 is inserted to the adapter insertion space 43 of the connector housing 40 from the adapter insertion opening 41.

A lead insertion opening 42 is formed at a bottom side of the connector housing 40. Four leads 101-104 that couple the controller 111 and the connector 14 are inserted to the lead insertion opening 42.

Further, the claw portion 45 having a semicircular annular shape is provided on an upper end side on one side of the connector housing 40. The claw portion 45 engages with a connector engaging protrusion 64 provided in the communication adapter 60, when the communication adapter 60 is attached to the connector 14.

A strap insertion opening 20 is formed in part of the upper second rib 16. The strap insertion opening 20 is a hole through which the strap 34 provided in the cap 30 is inserted, and is opened in a substantially rectangular shape. The strap 34 is inserted to the strap insertion space 21 included in the adapter housing portion 10 from the strap insertion opening 20.

The cap 30 includes a cap body 31, a display label 37, and the strap 34. The display label 37 has a cap button 37a and a LED window 37b. The display label 37 is affixed, for example, by an adhesive to top of the cap body 31 as will be described later.

A first engagement portion 32 and a second engagement portion 33, both having a substantially arc shape, extend downward from two ends along a Y axis at a lower surface side of the cap body 31.

Further, the strap 34 extends downward from a first end along the Z axis of the cap body 31 at the lower surface side of the cap body 31. The strap 34 is inserted to the main body-side housing space 13, and is further inserted into the strap insertion space 21 through the strap insertion opening 20. The strap 34 is made from a soft resin or plastic.

Figure 9:
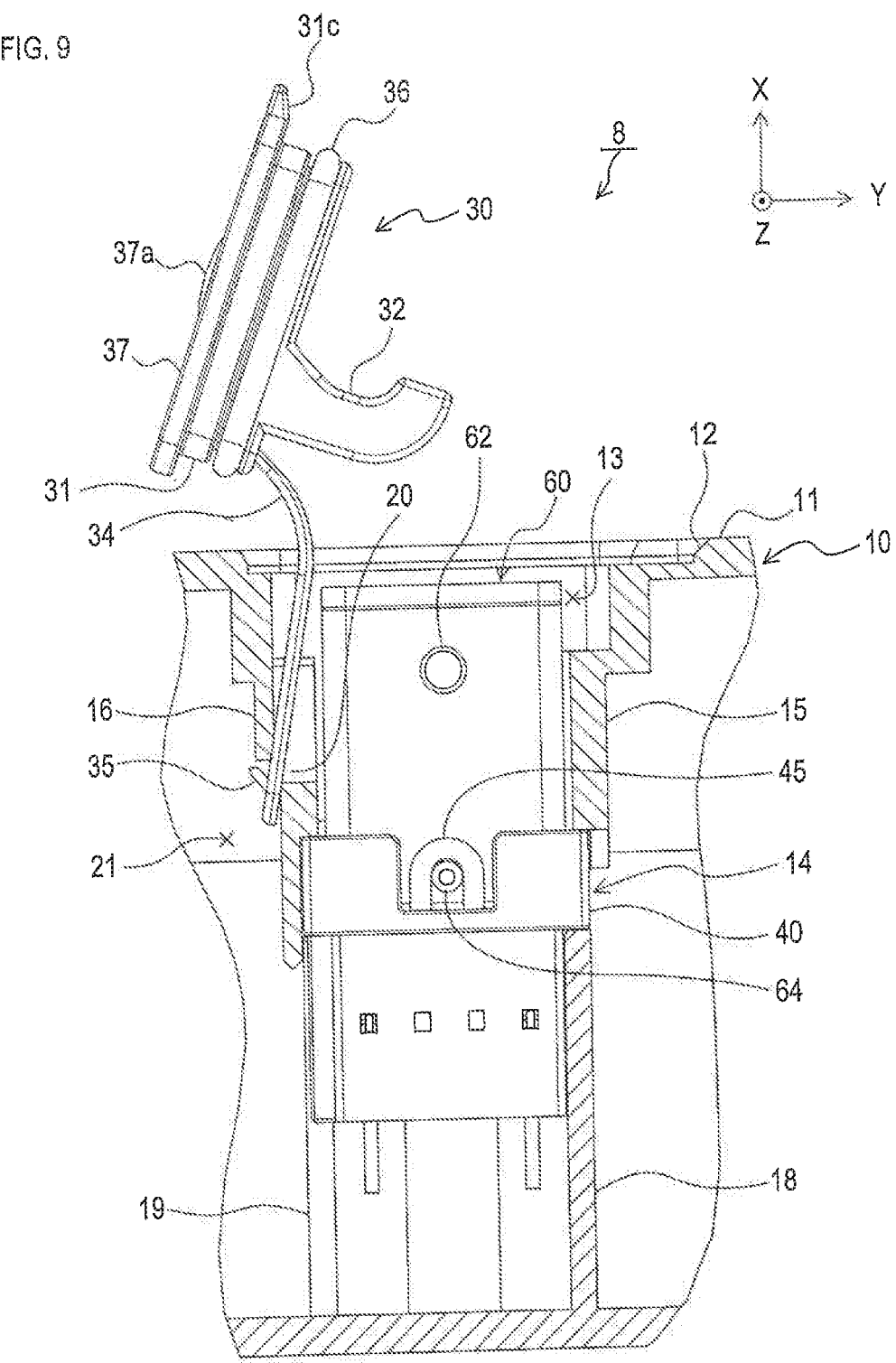
FIG. 9 is an explanatory diagram showing a state in which the communication adapter is attached to the adapter attachment portion.

A fold-back portion 35 is provided at a distal end of the strap 34, in order to retain the cap 30 as shown in FIG. 9.

The cap 30 is attached to the main body housing 6 so that the fold-back portion 35 is inserted to the strap insertion opening 20.

Further, a tab 31c is provided at a second end along the Z axis of the cap body 31 on the top side of the cap body 31.

Figure 10:
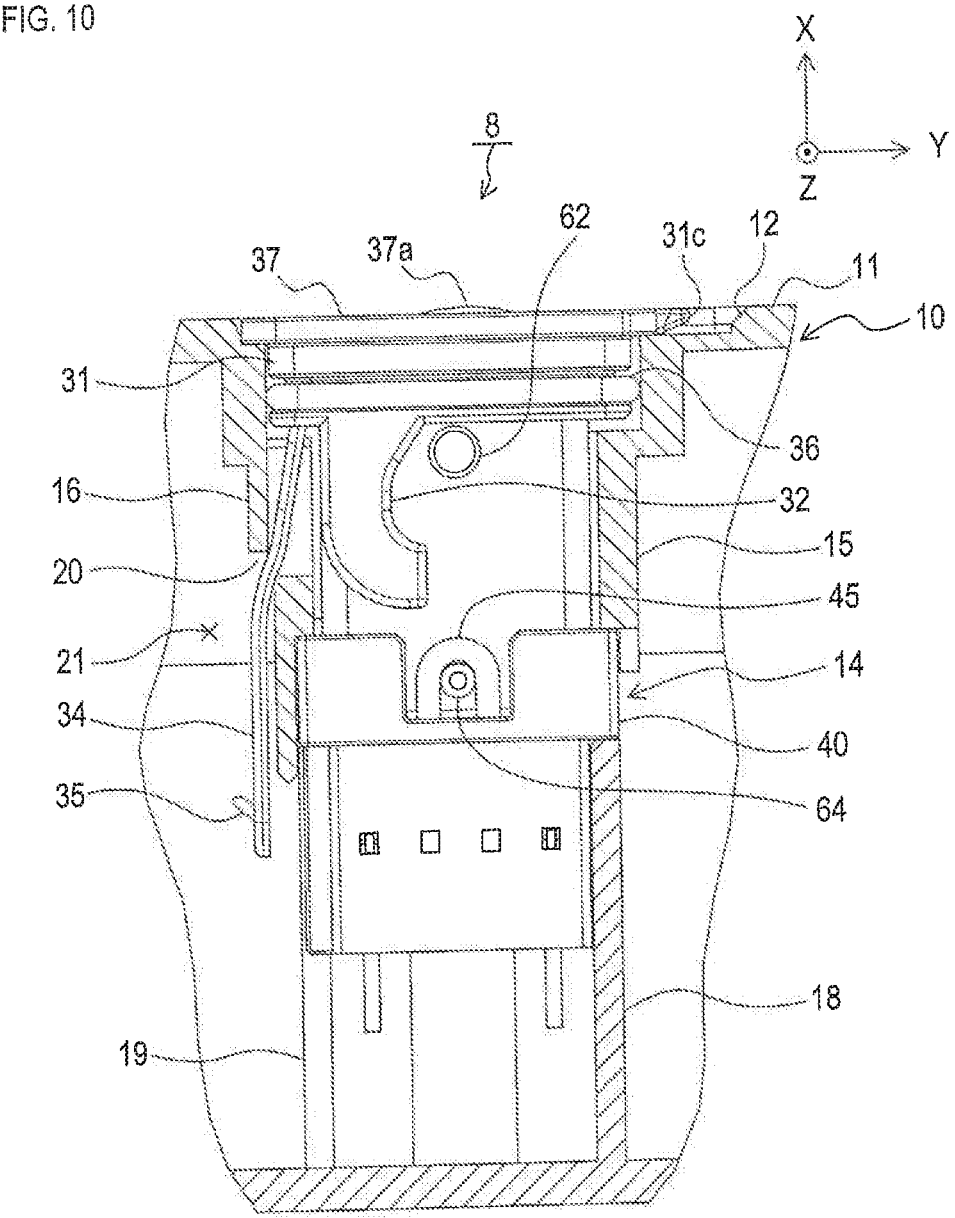
FIG. 10 is an explanatory view showing a state in which the communication adapter is attached to the adapter attachment portion and the cap is closed.

In addition, an O-ring 36 is provided over the entire circumference of the side surface of the cap body 31. The O-ring 36 is provided to shield the main body-side housing space 13 from outside. In other words, when the cap 30 is completely closed, the entire circumference of the O-ring 36 elastically contacts the inner wall of the main body-side housing space 13, as shown in FIG. 10.

Due to the elastic contact of the O-ring 36 with the main body-side housing space 13, airtightness of the main body-side housing space 13 is achieved, and entering of such as dust and water to the main body-side housing space 13 can be inhibited. Also, due to the elastic contact of the O-ring 36 with the main body-side housing 13, the cap 30 is frictionally supported tightly in the adapter insertion opening 12 and retains the cap 30 in the adapter insertion opening 12. In addition to the frictional support by the O-ring 36, a locking mechanism (not shown) may be provided for fixing the cap 30 in a closed state.

The communication adapter 60 includes an adapter case 61. The adapter case 61 accommodates a substantially rectangular module substrate 70. As described later, various circuits including the controller 111, wires and the like are provided on the module substrate 70.

Four strip-shaped insertion pieces 71, 72, 73, 74 are provided at a first end on a short side of the module substrate 70. These insertion pieces 71, 72, 73, 74 are formed by notching the first end on the short side of the module substrate 70.

Most part of the module substrate 70 is accommodated in the adapter case 61 of the communication adapter 60 but the insertion pieces 71-74 protrude from the adapter case 61.

Further, a first protrusion 62 and a second protrusion 63 are provided on respective side surfaces perpendicular to the Z-axis direction in the adapter case 61 of the communication adapter 60. Further, a connector engaging protrusion 64 is provided on the surface having the first protrusion 62. The first protrusion 62 and the second protrusion 63 engage with the first and second engaging portions 32, 33 of the cap 30, respectively. The connector engaging protrusion 64 engages with the claw portion 45 of the connector 14 when the communication adapter 60 is attached to the connector 14.

Further, a switch label 77 is affixed by an adhesive to a surface on the other end side in a longitudinal direction of the communication adapter 60. The switch label 77 includes a switch button 77a and a LED window 77b.

Figure 7:
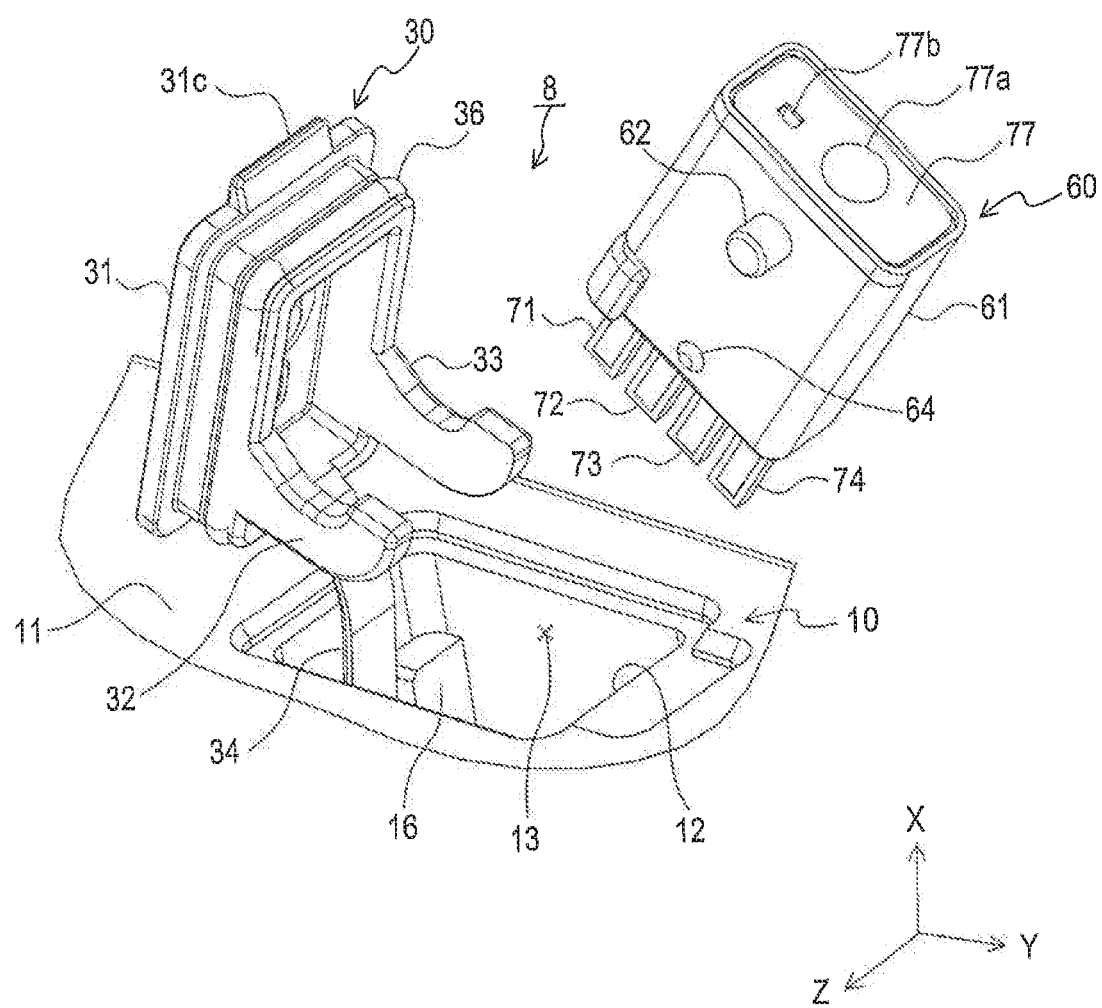
FIG. 7 is a perspective view showing an example of a state before attaching the communication adapter to the adapter attachment portion.

Next, a process for attaching the communication adapter 60 to the adapter attachment portion 8 will be schematically described. As shown in FIG. 7, before the communication adapter 60 is attached to the adapter attachment portion 8, the cap 30 is attached to the adapter housing portion 10. Specifically, as described above, the strap 34 of the cap 30 is inserted to the strap insertion opening 20.

Then, with the cap 30 opened as shown in FIG. 7, the communication adapter 60 is inserted to the main body housing space 13 from one end side provided with the insertion pieces 71-74, and is attached the internal connector 14. By closing the cap 30 after the communication adapter 60 is attached to the connector 14, attachment of the communication adapter 60 to the adapter housing portion 10 is completed.

In a state in which the communication adapter 60 is attached to the adapter housing portion 10 and the cap 30 is closed, the user can turn on the adapter switch 79 of the communication adapter 60 by depressing the cap button 37a of the cap 30. Further, the user can view the LED 80 of the communication adapter 60 through the LED window 37b of the cap 30 and through the aligned LED windows 31b, 77b, and 66b.

More specific description will be given on the fact that the user can operate the adapter switch 79 of the communication adapter 60 and view the LED 80 of the communication adapter 60 from outside of the cap 30.

Figure 8:
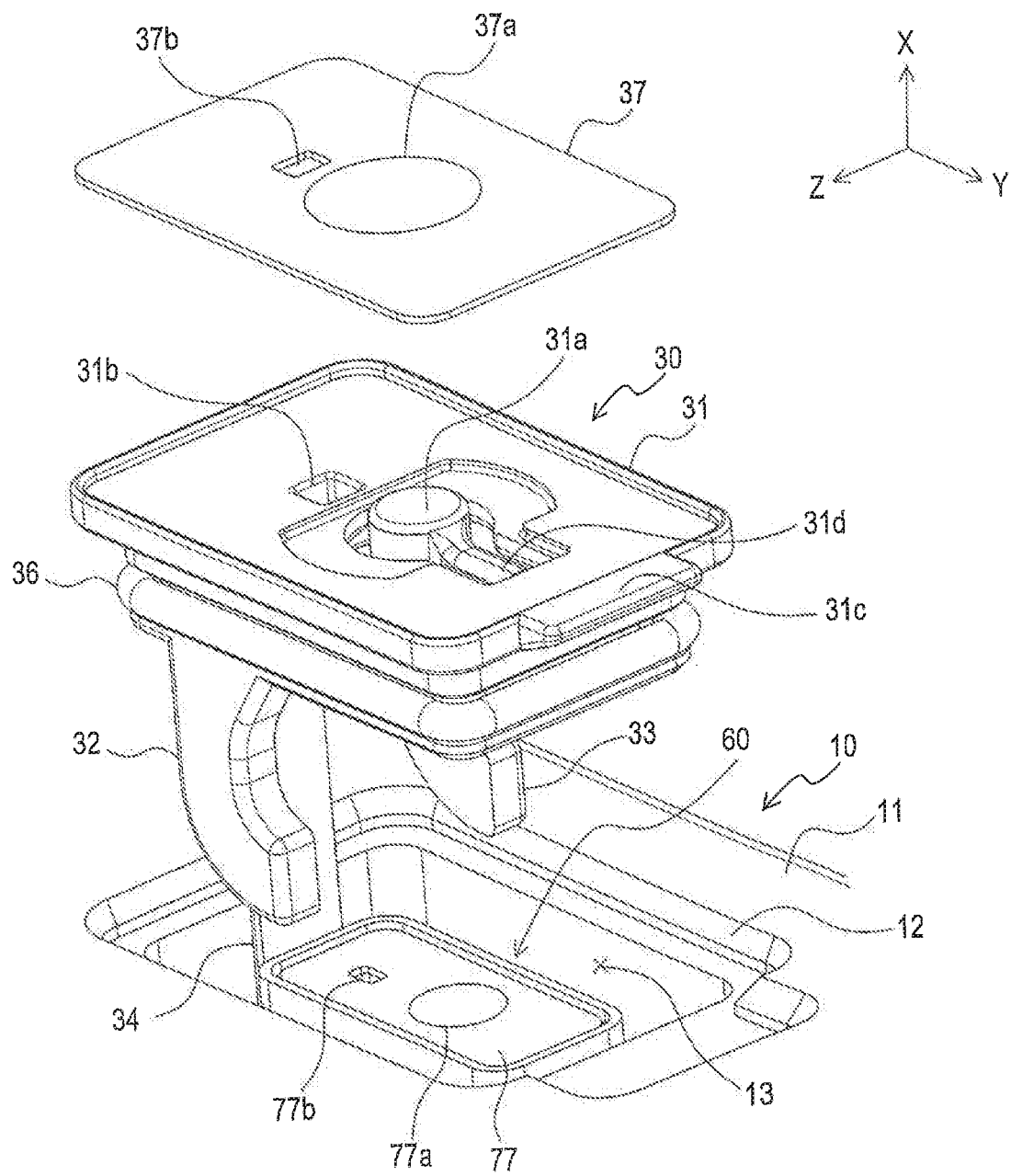
FIG. 8 is an explanatory view showing a detail of a top structure of the cap.

As shown in FIG. 8, the cap body 31 included in the cap 30 includes a button operation piece 31a, and an LED window 31b. The cap body 31 as a whole is integrally formed, for example, of polypropylene.

The LED window 31b is a hole penetrating in the X-axis direction. The button operation piece 31a is coupled to a first end of a support shaft 31d and is supported by the support shaft 31d. A penetrating groove penetrating in the X-axis direction is formed around each of the button operation piece 31a and the support shaft 31d of the cap body 31 over the substantially entire circumference thereof. The support shaft 31d is coupled to the cap body 31 at a second end opposite to the first end to which the button operation piece 31a is coupled.

The button operation piece 31a is swingable in the X-axis direction about the second end of the support shaft 31d. In other words, when a load in the X-axis direction is applied to the button operation piece 31a, the button operation piece 31a moves in the loading direction.

The display label 37 affixed to the top of the cap body 31 is made of, for example, polycarbonate as a whole. In the display label 37, the cap button 37a is for example formed by embossing. In other words, the cap button 37a has a spherically raised shape toward the top side in the X-axis direction.

The cap button 37a elastically moves in the loading direction when receiving a load in the X-axis direction, and then returns to its original position when the load is removed. In other words, the cap button 37a is configured so as to be elastically deformed by a load in the X-axis direction.

The LED window 37b is made from a transparent material so that a user can view the LED 80 of the communication adapter 60. In other words, the LED window 37b does not penetrate like the LED window 31b formed in the cap body 31.

In a state in which the display label 37 is affixed to the top of the cap body 31, the button operation piece 31a of the cap body 31 and the cap button 37a of the display label 37 exactly overlap in the X-axis direction. Moreover, the LED window 31b of the cap body 31 and the LED window 37b of the display label 37 also exactly overlap in the X-axis direction.

Further, in a state in which the communication adapter 60 is attached and the cap 30 is closed, i.e. in a state as shown in FIG. 10, the button operation piece 31a of the cap body 31, the cap button 37a of the display label 37, and the switch button 77a of the communication adapter 60 exactly overlap in the X-axis direction. Further, the LED window 31b of the cap body 31, the LED window 37b of the display label 37, and the LED window 77b of the communication adapter 60 substantially overlap in the X-axis direction.

Therefore, when a user looks through the LED window 37b of the display label 37 from outside of the cap 30, the user can view the LED 80 disposed behind the LED window 77b through the LED window 37 of the display label 37, the LED window 31b of the cap body 31 behind the LED window 37b, and the LED window 77b of the communication adapter 60 behind the LED window 31b.

Moreover, when the cap button 37a of the cap 30 is depressed, the button operation piece 31a of the cap body 31 moves in the depressing direction in response to the load from the cap button 37a. When the button operation piece 31a of the cap body 31 moves in the depressing direction, the button operation piece 31a is brought into contact with the switch button 77a of the communication adapter 60, and depresses the switch button 77a. When the switch button 77a of the communication adapter 60 is depressed, the switch button 77a is brought into contact with the adapter switch 79 of the communication adapter 60, as described below, and the adapter switch 79 is turned on.

In other words, the user can turn on the adapter switch 79 of the communication adapter 60 by depressing the cap button 37a of the cap 30 while keeping the cap 30 closed and without opening the cap 30. Further, the user can view the LED 80 of the communication adapter 60 from outside of the cap 30 while keeping the cap 30 closed and without opening the cap 30.

The display label 37 of the cap 30 also has a function to inhibit entering of foreign matter such as dust and water to inside of the adapter housing portion 10 through the cap 30. In other words, without the display label 37, foreign matter may enter from the penetrating groove formed around the button operation piece 31a in the cap body 31. In contrast, by affixing the display label 37 to the top of the cap body 31, the penetrating groove around the button operation piece 31a is closed, which thereby inhibits entering of foreign matter to inside of the adapter housing portion 10.

FIG. 9 shows a state in which the communication adapter 60 is attached to the adapter attachment portion 8, i.e., a state in which the communication adapter 60 is attached to the connector 14. When the communication adapter 60 is attached to the connector 14, the connector engaging protrusion 64 provided in the communication adapter 60 engages with the claw portion 45 of the connector 14. Thus, the communication adapter 60 is locked to the connector 14. Removal of the connector 14 from the communication adapter 60 due to vibration or the like is inhibited.

Further, FIG. 9 shows a state in which the cap 30 is attached to the adapter housing portion 10, i.e., a state in which the strap 34 of the cap 30 is inserted to the strap insertion space 21 through the strap insertion opening 20. As shown in FIG. 9, the fold-back portion 35 at the distal end of the strap 34 is inserted to the strap insertion opening 20. Therefore, even if an attempt is made to pull out the strap 34 from the strap insertion opening 20, the fold-back portion 35 is caught around the strap insertion opening 20. It is difficult to completely pull out the strap 34. Therefore, the cap 30 is inhibited from dropping off from the main body housing 6.

Next, a process for taking out the communication adapter 60 by opening the cap 30 from the state in which the communication adapter 60 is attached and the cap 30 is completely closed will be described with reference to FIGS. 10 to 12.

FIG. 10 shows a state in which the communication adapter 60 is attached and the cap 30 is completely closed. The cap 30 can be opened by pulling a tab 31c of the cap 30 upward from the above state. When the tab 31c of the cap 30 is pulled upward, the cap 30 rotates about an end of the cap 30 opposite to the tab 31c, as shown in FIG. 11.

Figure 11:
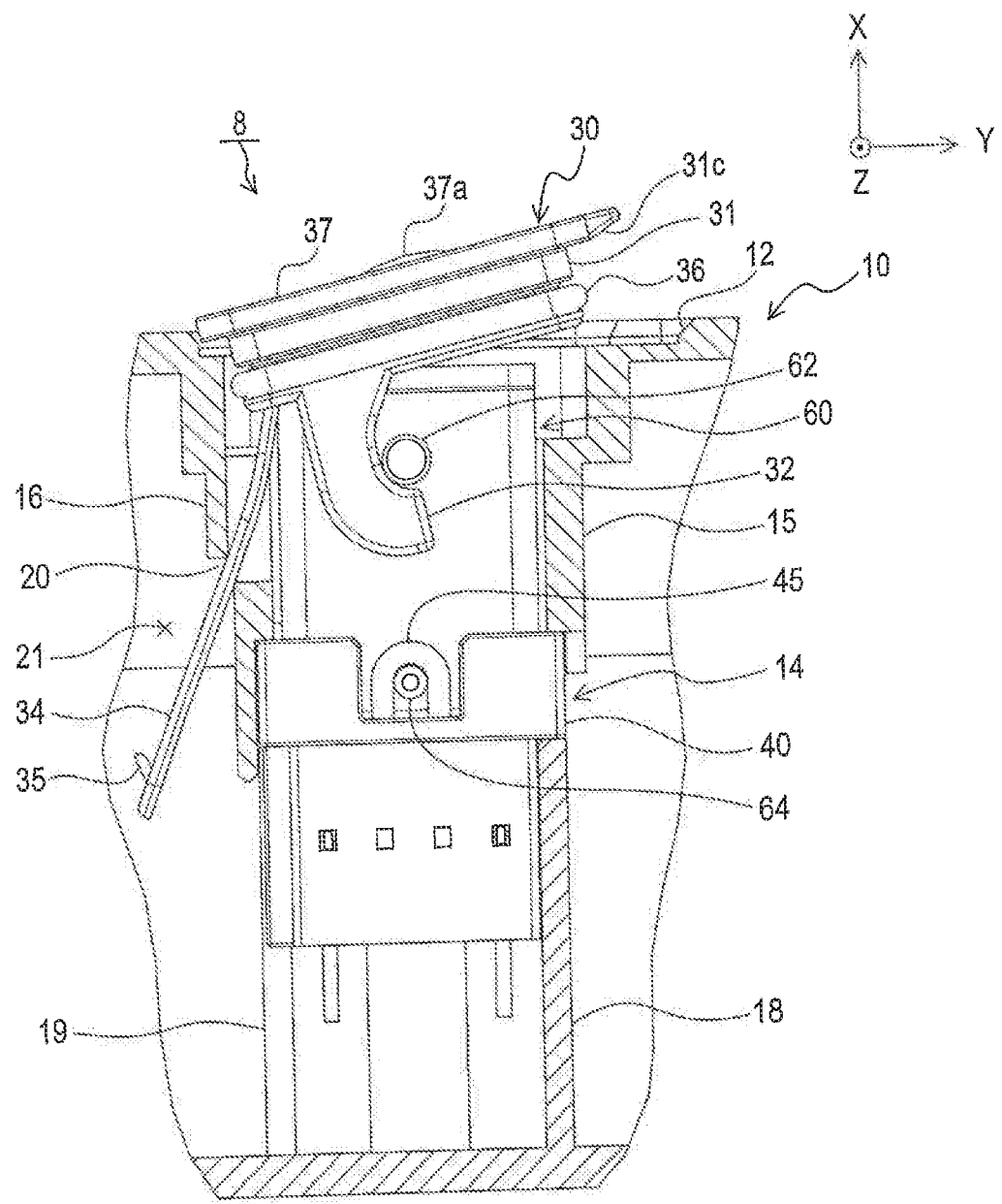
FIG. 11 is an explanatory view showing a state in which the cap is started to be opened from the state in FIG. 10.

As a result, as shown in FIG. 11, the first engagement portion 32 provided in the cap 30 engages with the first protrusion 62 of the communication adapter 60. Although not shown in FIG. 11, in a side surface opposite to a surface of the communication adapter 60 provided with the protrusion 62, the second engagement portion 33 provided in the cap 30 engages with the second protrusion 63 of the communication adapter 60.

Figure 12:
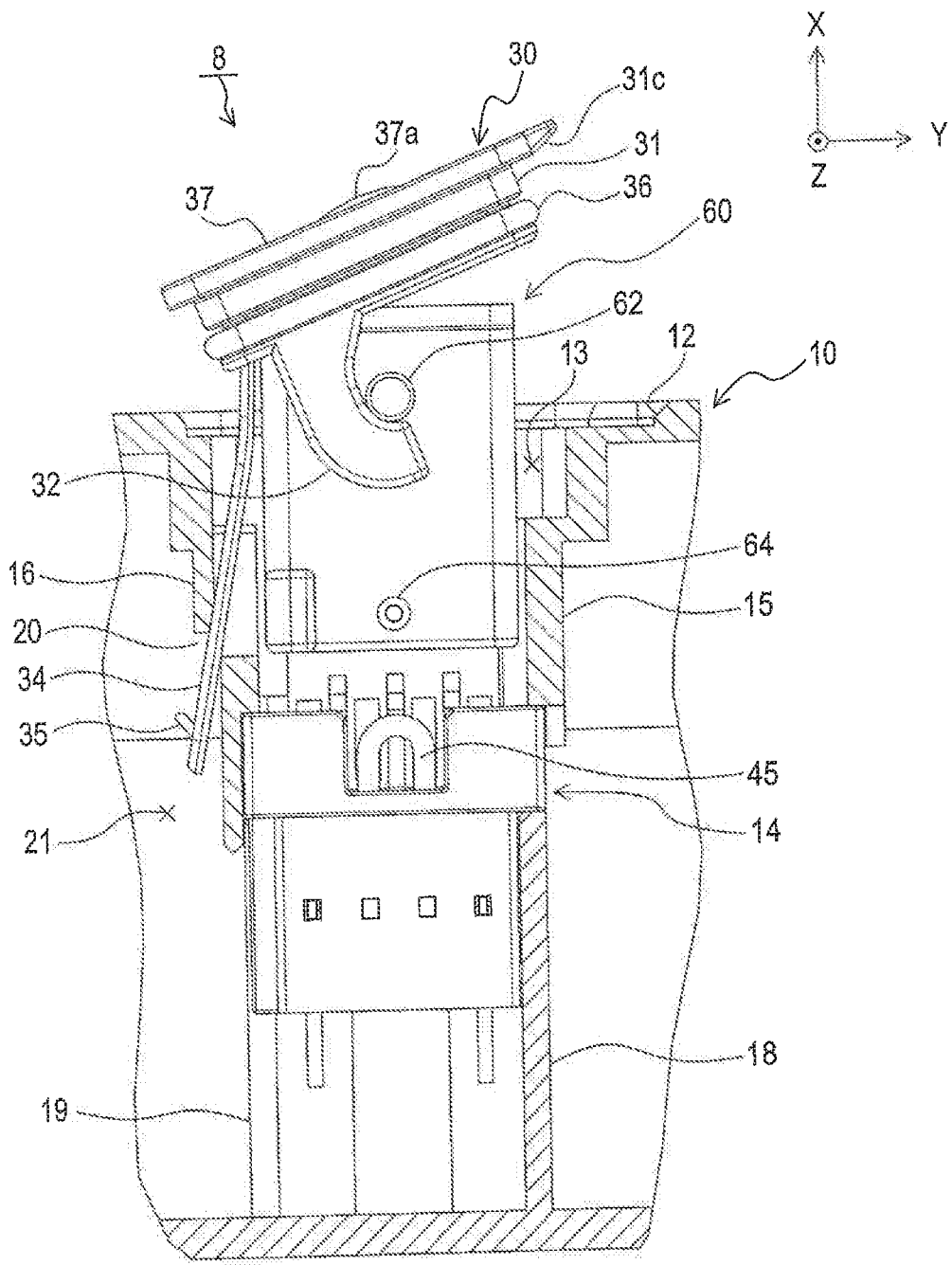
FIG. 12 is an explanatory view showing a state in which the communication adapter is pulled out by further opening the cap from the state in FIG. 11.

When the tab 31c of the cap 30 is further pulled upward from a state as above in which the engagement portions 32, 33 of the cap 30 are in engagement with the protrusions 62, 63 of the communication adapter 60, respectively, the communication adapter 60 is also raised together with the cap 30, as shown in FIG. 12. When the load applied via the protrusions 62, 63 of the communication adapter 60 from the engaging portions 32, 33 of the cap 30 exceeds a certain level, the claw portion 45 of the connector 14 is elastically deformed, so that the connector engaging protrusion 64 is disengaged from the claw portion 45. Therefore, by gradually raising the tab 31c of the cap 30 upward, the communication adapter 60 can be removed from the connector 14.

(1-4) Detailed Structure of Communication Adapter

Figure 13:
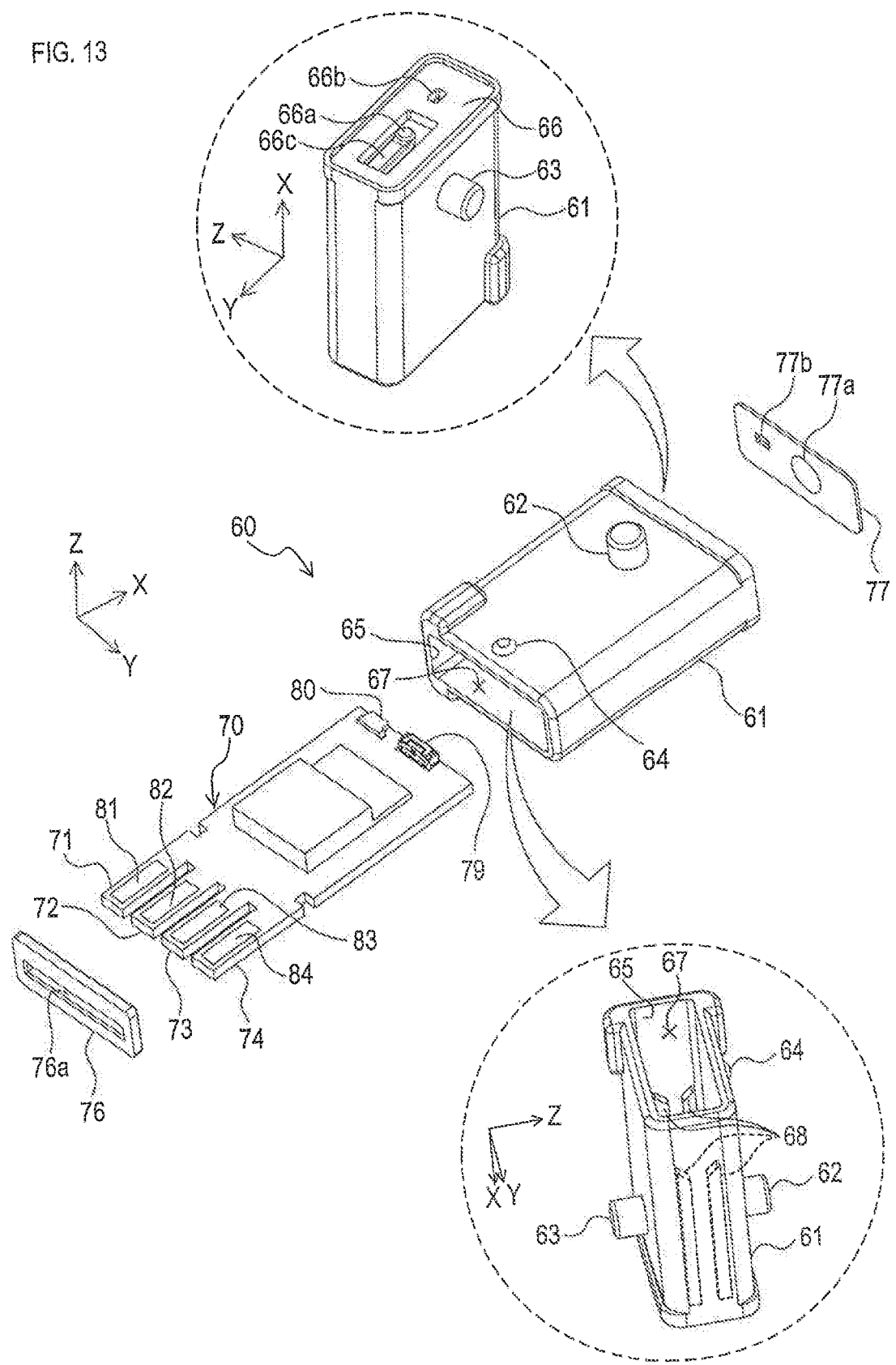
FIG. 13 is an exploded perspective view showing a detailed structure of the communication adapter.

Next, a detailed structure of the communication adapter 60 will be described with reference to FIGS. 13 and 14. As shown in FIG. 13, the communication adapter 60 includes the adapter case 61 and the module substrate 70. The adapter case 61 is, for example, made of resin. The adapter case 61 has a substrate insertion opening 65 open at a first end in the X-axis direction and an input/output end face 66 at a second end.

The respective circuits, elements or the like shown in FIG. 2 are provided and implemented in the module substrate 70. In other words, the four strip-shaped insertion pieces 71, 72, 73, 74 are provided at the first end on the short side of the module substrate 70. Further, as shown in FIGS. 13 and 14, contacts 81-88 are provided on both surfaces of the respective insertion pieces 71, 72, 73, 74. Specifically, a first contact 81 is formed on one of two surfaces of the first insertion piece 71, and a not shown fifth contact 85 is formed on the other. A second contact 82 is formed on one of two surfaces of the second insertion piece 72, and a not shown sixth contact 86 is formed on the other. A third contact 83 is formed on one of two surfaces of the third insert 73, and a now shown seventh contact 87 is formed on the other. A fourth contact 84 is formed on one of two surface of the fourth insert 74, and a not shown eighth contact 88 is formed on the other. Total of eight contacts 81-88 formed in the respective insertion pieces 71-74 are included in the connection terminal 122 shown in FIG. 2.

The adapter switch 79 and the LED 80 are implemented at a second end on the short side of the module substrate 70.

The module substrate 70 is inserted to the adapter case 61 from the substrate insertion opening 65, and is disposed within a substrate insertion space 67 of the adapter case 61. Four substrate insertion ribs 68 are provided on the inner wall of the adapter case 61. The module substrate 70 is guided by these four substrate insertion ribs 68 into the substrate insertion space 67. Further, the module substrate 70 is supported by the four substrate insertion ribs 68 inside the substrate insertion space 67.

A switch operation piece 66a and a LED window 66b are provided on the input/output end face 66 of the adapter case 61. The switch operation piece 66a and the LED window 66b are basically configured in the same manner as the button operation pieces 31a and the LED window 31b provided in the cap body 31, and have the same function.

The LED window 66b is a hole penetrating in the X-axis direction. The switch operation piece 66a is provided at a first end of a support shaft 66c, and can swing in the X-axis direction about a second end of the support shaft 66c. In other words, when a load in the X-axis direction is applied to the switch operation piece 66a, the switch operation piece 66a moves in the loading direction.

The communication adapter 60 includes a case cover 76, and a switch label 77. The case cover 76 is, for example, made from a rubber plate member, and has a rectangular substrate insertion hole 76a.

The switch label 77 is basically configured in the same manner as the display label 37 of the cap 30. In other words, the switch label 77 is, for example, made of polycarbonate, and has a switch button 77a and a LED window 77b.

The switch button 77a when receiving a load in the X-axis direction, elastically moves in the loading direction, and, when the load is removed, returns to its original position. In other words, the switch button 77a is formed so as to be elastically deformed by a load in the X-axis direction. The LED window 77b is made from a transparent material so that a user can view the LED 80 of the communication adapter 60. The LED window 77b does not penetrate like the LED window 31b provided in the cap body 31 and the LED window 66b provided on the input/output end face 66 of the adapter case 61.

Figure 14:
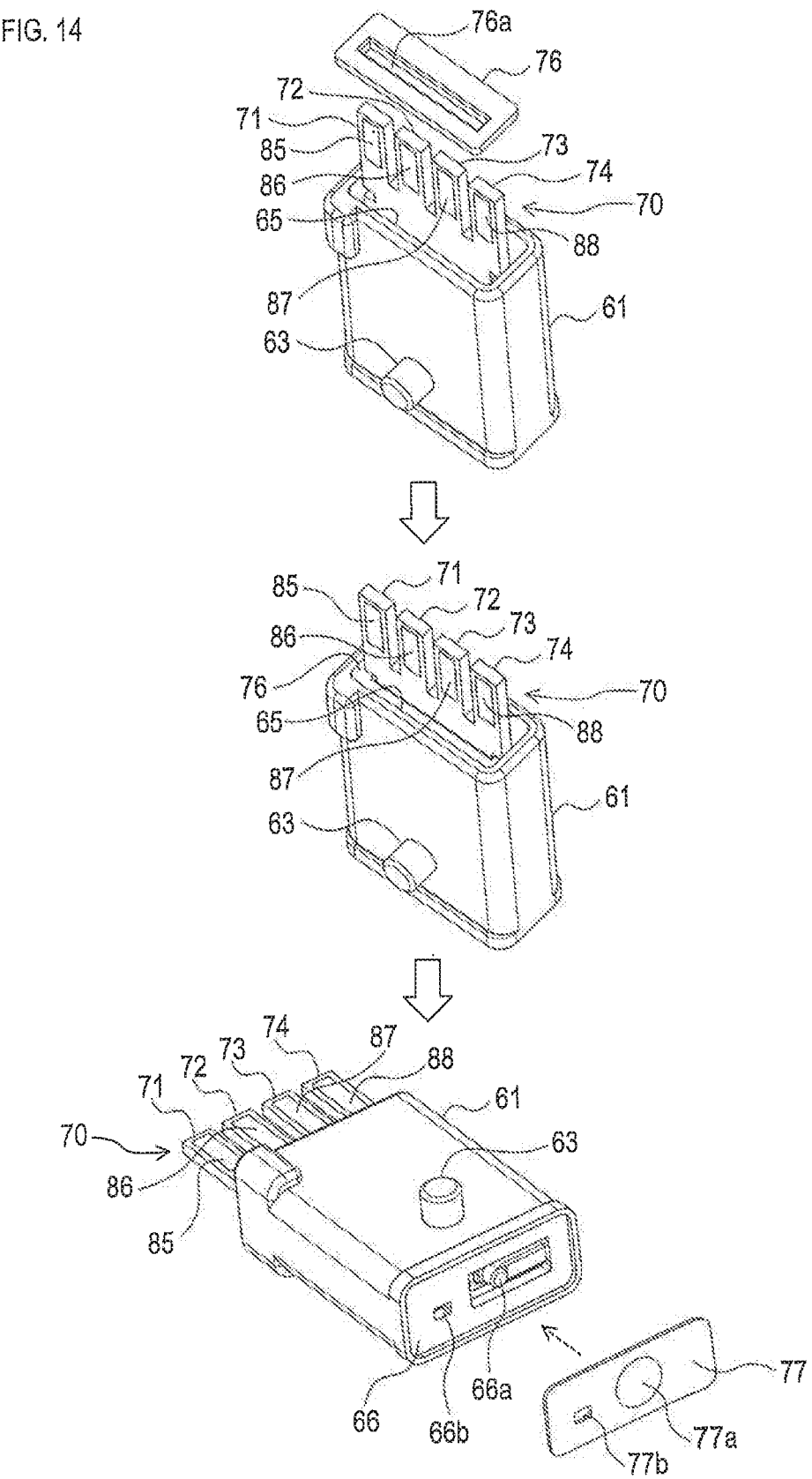
FIG. 14 is an explanatory diagram for explaining part of an assembly process of the communication adapter.

In an assembling process of the communication adapter 60, the case cover 76 is attached to the adapter case 61 after the module substrate 70 is inserted to the adapter case 61, as shown in FIG. 14. In other words, the case cover 76 is attached to the adapter case 61 to which the module substrate 70 is inserted, from one end side of the module substrate 70 provided with the insertion pieces 71-74.

Specifically, the respective insertion pieces 71-74 of the module substrate 70 are inserted to the substrate insertion hole 76a of the case cover 76. Then, the case cover 76 is disposed so as to cover the substrate insertion opening 65 of the adapter case 61. Thereafter, a sealing material such as, for example, an epoxy resin is applied over the entire surface of the substrate insertion opening 65 from top of the case cover 76. Thereby, the substrate insertion opening 65 is sealed. As a result, entering of foreign matter such as dust and water from the substrate insertion opening 65 to the adapter case 61 is inhibited.

The switch label 77, as shown in FIG. 14, is affixed by an adhesive to the input/output end face 66 of the adapter case 61. In a state in which the switch label 77 is affixed to the input/output end face 66, the switch operation piece 66a of the input/output end face 66 and the switch button 77a of the switch label 77 exactly overlap. Moreover, the LED window 66b of the input/output end face 66 and the LED window 77b of the switch labels 77 substantially overlap.

Therefore, the user, when looking through the LED window 77b of the switch label 77 from outside of the switch label 77, can view the LED 80 implemented on the module substrate 70 through the LED window 77b of the switch label 77 and the LED window 66b of the input/output end face 66 behind the LED window 77b. Further, when the user depresses the switch button 77a of the switch label 77, the switch operation piece 66a of the input/output end face 66 is depressed through the switch button 77a, and the switch operation piece 66a moves in the depressing direction. Thus, the switch operation piece 66a implemented on the module substrate 70 is brought into contact with the adapter switch 79 and the adapter switch 79 is turned on.

Therefore, the user, after inserting the communication adapter 60 to the connector 14 and before closing the cap 30, can access the communication adapter 60 through the switch label 77. In addition, as described above, even after closing the cap 30, the user can access the communication adapter 60 through the cap button 37a and the LED window 37b provided in the display label 37 of the cap 30.

(1-5) Detailed Structure of Connector

A detailed structure of the connector 14 will be described with reference to FIGS. 15 to 18. The connector housing 40 included in the connector 14 has the adapter insertion opening 41 and the adapter insertion space 43, as described above.

Figure 15:
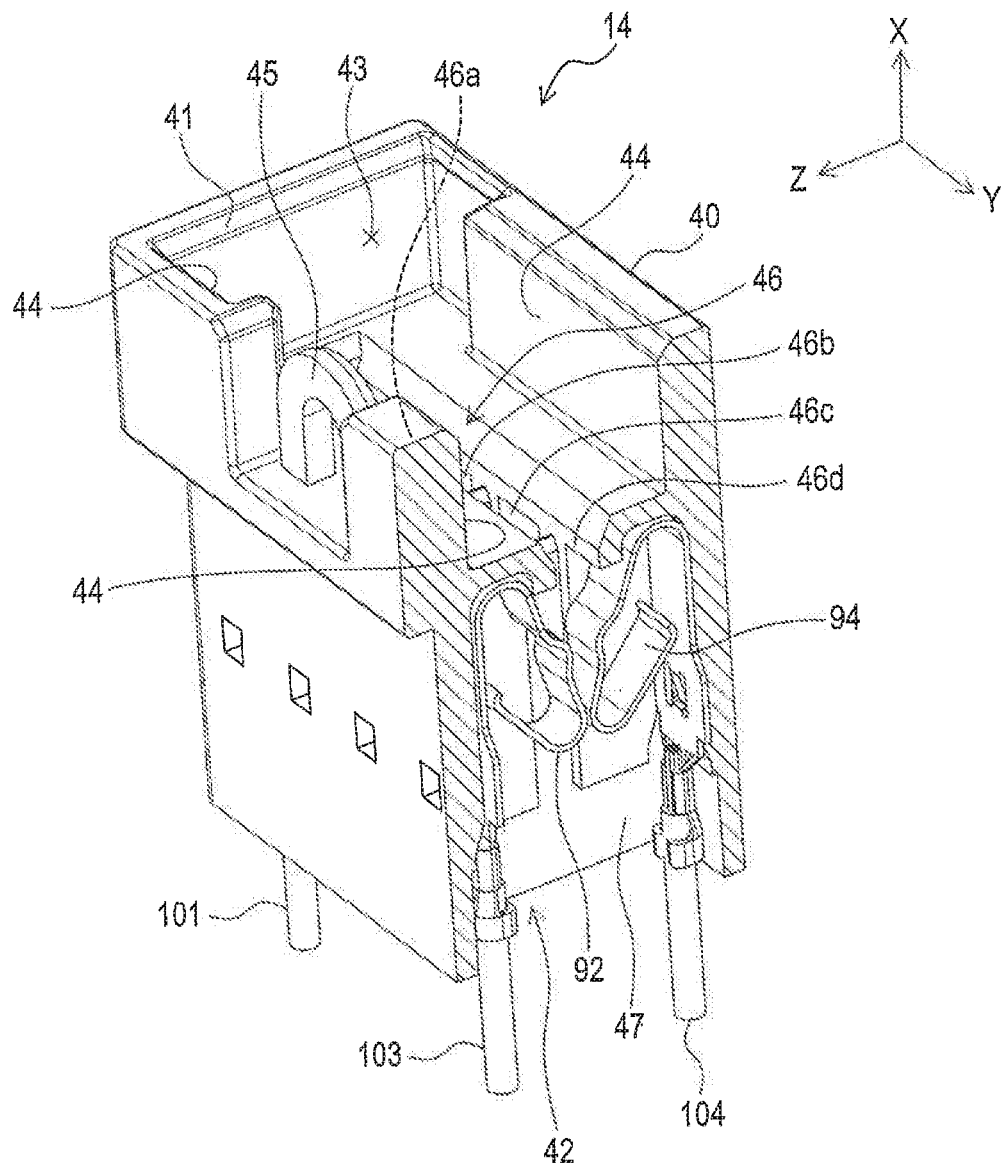
FIG. 15 is a XZ plane perspective cross-sectional view of the connector.
Figure 16:
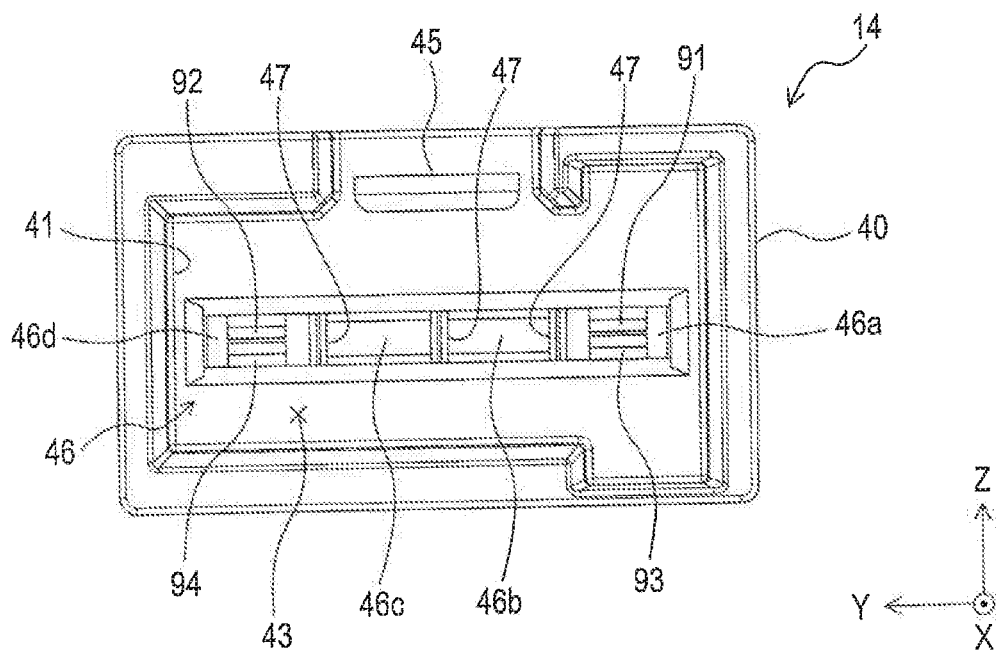
FIG. 16 is a top view of the connector.

The connector housing 40 has a substrate insertion slot 46 at a bottom side of the adapter insertion space 43, as shown in FIGS. 15 and 16. The substrate insertion slot 46, particularly, has four insertion slots 46a, 46b, 46c, 46d. The respective slots 46a, 46b, 46c, 46d are holes having a substantially rectangular opening and are aligned in a row in the Y-axis direction. The insertion pieces 71-74 of the communication adapter 60 are inserted to the slot 46a, 46b, 46c, 46d, respectively.

In other words, the first insertion piece 71 of the communication adapter 60 is inserted to the first slot 46a. The second insertion piece 72 of the communication adapter 60 is inserted to the second slot 46b. The third insertion piece 73 of the communication adapter 60 is inserted to the third slot 46c. The fourth insertion piece 74 of the communication adapter 60 is inserted to the fourth slot 46d.

Figure 17:
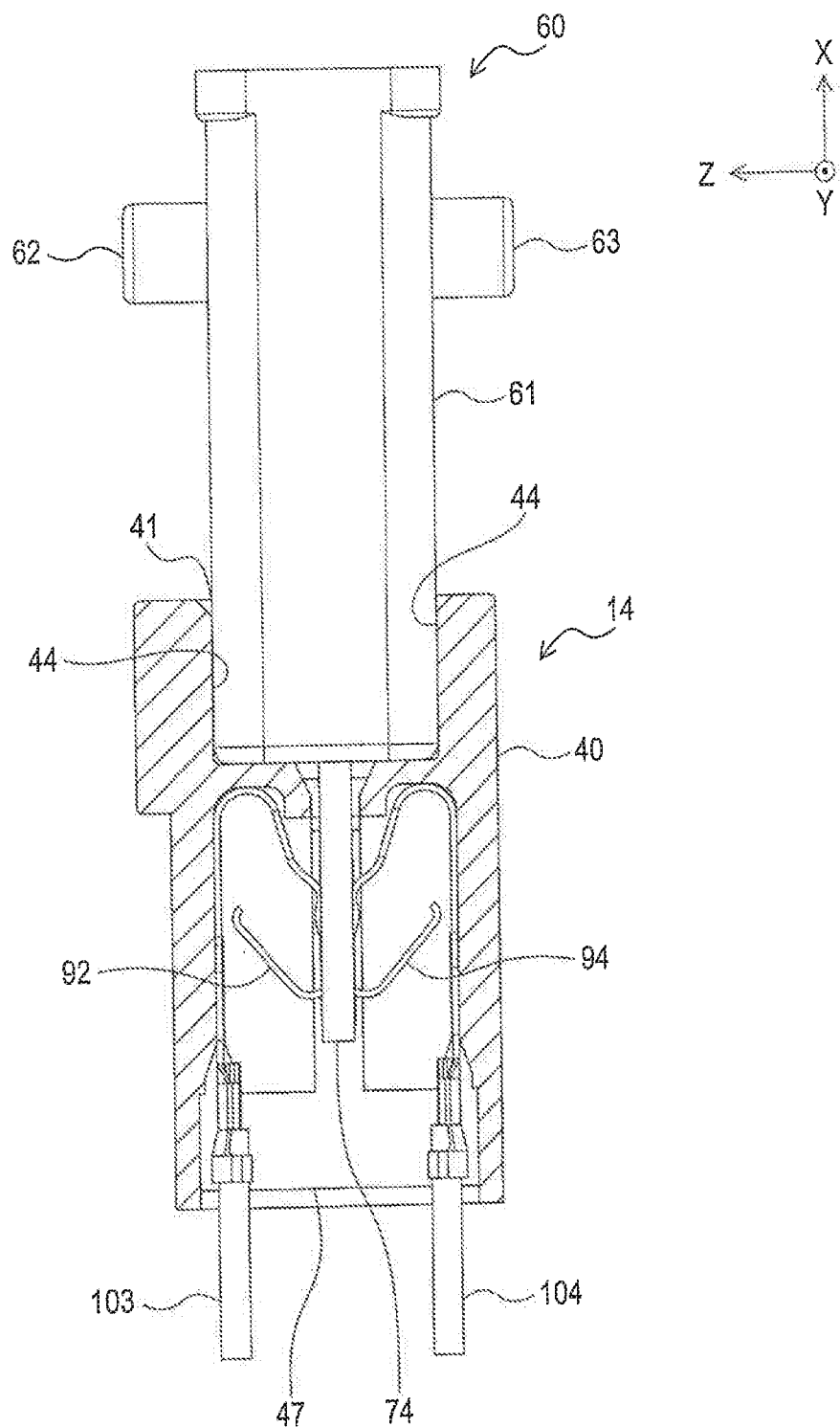
FIG. 17 is a XZ plane cross-sectional view of the connector to which the communication adapter is attached.

Each of the first slot 46a and the fourth slot 46d of the four slots is provided with two terminals. Specifically, the fourth slot 46d has a second terminal 92 and a fourth terminal 94, as shown in FIGS. 15-18. The second terminal 92 and the fourth terminal 94 have the same shape, and are arranged so that their contacts face each other. As shown in FIGS. 15, 17, and 18, a lead 103 inserted from the lead insertion opening 42 is coupled to the second terminal 92, and a lead 104 inserted from the lead insertion opening 42 is coupled to the fourth terminal 94.

When the fourth insertion piece 74 of the communication adapter 60 is inserted to the fourth slot 46d, the fourth insertion piece 74 is inserted between the second terminal 92 and the fourth terminal 94, and are held between the two terminals 92 and 94 on both sides. At this time, the second terminal 92 is brought into contact and electrically conductive with the fourth contact 84 provided in the fourth insertion piece 74, and the fourth terminal 94 is brought in contact and electrically conductive with the eighth contact 88 provided in the fourth insertion piece 74.

As shown in FIGS. 16 and 18, the first slot 46a has a first terminal 91 and a third terminal 93. Both the first terminal 91 and the third terminal 93 have the same shape as the second terminal 92 and the fourth terminal 94. Also, a positional relationship between the first terminal 91 and the third terminal 93 in the first slot 46a is the same as a positional relationship between the second terminal 92 and the fourth terminal 94 in the fourth slot 46d. In other words, the first terminal 91 and the third terminal 93 are also arranged so that their contacts face each other. Further, as shown in FIG. 18, the lead 101 inserted from the lead insertion opening 42 is coupled to the first terminal 91, and the lead 102 inserted from the lead insertion opening 42 is coupled to the third terminal 93. The leads 101 to 104 are coupled to the controller 111.

When the first insertion piece 71 of the communication adapter 60 is inserted to the first slot 46a, the first insertion piece 71 is inserted between the first terminal 91 of the third terminal 93, and are held between the two terminals 91 and 93 on both sides. At this time, the first terminal 91 is brought into contact and electrically conductive with the first contact 81 provided in the first insertion piece 71, and the third terminal 93 is brought into contact and electrically conductive with the fifth contact 85 provided in the first insertion piece 71. In other words, by inserting the insertion pieces 71-74 to the connector 14, the connection terminal 122 and the connector 14 are coupled, and the communication adapter 60 and the main body 3 are electrically coupled.

Terminals can be arranged also in the second slot 46b and the third slot 46c, in the same manner as in the other slots 46a, 46d, but they are omitted in this embodiment.

The mutually adjacent slots are physically partitioned by a partition wall 47, as shown in FIGS. 15 to 18. Thus, in case that both the adjacent slots have a terminal, short-circuiting between the terminals is inhibited. In other words, installation of the partition wall 47 inhibits short-circuiting of the terminals arranged in the mutually adjacent slots due to direct contact, and also inhibits short-circuiting through foreign matter such as dust and water entering between the terminals.

When the communication adapter 60 is attached to the connector 14, a lower part of the communication adapter 60 enters the adapter insertion space 43 of the connector 14, as shown in FIG. 17. Majority of the side surface of the communication adapter 60 entering the adapter insertion space 43 is in close contact with an insertion inner wall 44 of the connector 14.

In other words, the communication adapter 60 is deeply held by the insertion inner wall 44 of the connector housing 40, and the communication adapter 60 is stably held in the connector housing 40. Also, since the communication adapter 60 is stably held in the connector housing 40 as such, electrical connection between the contacts of the communication adapter 60 and the terminals of the connector 14 is stabled. Chattering due to vibration or the like is inhibited.

An elastic member for a sealing purpose may be provided over the entire circumference of the side surface of the adapter case 61 entering the adapter insertion space 43 of the connector 14, or over the entire circumference of the insertion inner wall 44 of the connector housing 40.

As such, when the communication adapter 60 is attached to the connector 14, communication adapter 60 is more stably held by the insertion inner wall 44 of the connector housing 40. Also, entering of foreign matter such as dust and water to inside of the connector 14 from the adapter insertion opening 41 can be effectively inhibited.

The lead insertion opening 42 that is formed at the bottom of the connector housing 40 is closed by a bottom sealing plate 50, as shown in FIG. 18. The bottom sealing plate 50 is a thin plate-like member as a whole, and has four lead insertion notches 51 through which the four leads 101-104 are inserted.

The bottom sealing plate 50, as shown in FIG. 18, is disposed so as to cover the entire lead insertion opening 42 at the bottom of the connector housing 40. When the lead insertion opening 42 of the connector housing 40 is covered by the bottom sealing plate 50, each of the leads 101 to 104 is inserted to the corresponding one of the four lead insertion notches 51 provided on the bottom sealing plate 5. Each of the lead insertion notches 51 of the bottom sealing plate 50 is sealed by a sealing material in a state in which the lead is inserted. Thus, entering of foreign matter such as dust and water to inside of the connector 14 from the lead insertion opening 42 is inhibited.

(1-6) Effects of Embodiment

According to the embodiment described above, the following effects are exhibited.

Even in a state in which the communication adapter 60 is stably attached, i.e., even when the cap 30 is closed, the user can indirectly access the communication adapter 60 via the display label 37 provided in the cap 30. Therefore, while stable attachment of the communication adapter 60 to the electric working machine 1 is enabled, entering of foreign matter such as dust and water to inside of the electric working machine 1 and of the communication adapter 60 can be inhibited or avoided.

Specifically, the cap button 37a is provided in the display label 37 of the cap 30. When the user depresses the cap button 37a, the adapter switch 79 of the communication adapter 60 is turned on. Therefore, the user can indirectly turn on the adapter switch 79 of the communication adapter 60 through the cap button 37a in a state in which the cap 30 is closed.

The LED window 37b is provided in the display label 37 of the cap 30. Therefore, even if the cap 30 is closed, the user can view the LED 80 of the communication adapter 60 through the LED window 37b.

Further, the first protrusion 62 and second protrusion 63 are provided on the respective sides of the communication adapter 60. The cap 30 includes the first engagement portion 32 and the second engagement portion 33 that respectively correspond to the protrusions 62 and 63. When the cap 30 is opened from the closed state, the first and second engaging portions 32, 33 of the cap 30 respectively engage with the first and second protrusions 62, 63 of the communication adapter 60, and the communication adapter 60 is detached from the connector 14 in accordance with the opening operation of the cap 30, as described with reference to FIGS. 10 to 12.

Therefore, when the communication adapter 60 is pulled out, an operation of the user such as grabbing and pulling out the communication adapter 60 after opening the cap 30 becomes unnecessary. The user can easily and efficiently take out the communication adapter 60 along with the opening operation of the cap 30.

Further, the cap 30 includes the elongated strap 34, and the strap 34 includes the fold-back portion 35 at a distal end thereof. Therefore, even if an attempted is made to pull out the strap 34 from the strap insertion opening 20, the fold-back portion 35 is caught at the strap insertion opening 20. Thus, the strap 34 cannot be easily pulled out. Therefore, the cap 30 can be easily rotated between the closed position and the open position while making it difficult for the cap 30 to be detached from the electric working machine 1. Loss of the cap 30 can be inhibited.

2. Other Embodiments

An embodiment of the present disclosure has been described in the above. However, the present disclosure is not limited to the above embodiment and can be modified in various ways.

(2-1) In the above embodiment, as shown in FIG. 1, the adapter attachment portion 8 is provided on the left side surface of the handle portion 6c, and the communication adapter 60 can be inserted to and pulled out of the left side surface of the handle portion 6c. However, the position of the adapter attachment portion 8 in the electric working machine 1 is not limited to the position shown in FIG. 1. The position where the adapter attachment portion 8 is provided in the electric working machine 1 may be determined as appropriate.

Figure 19:
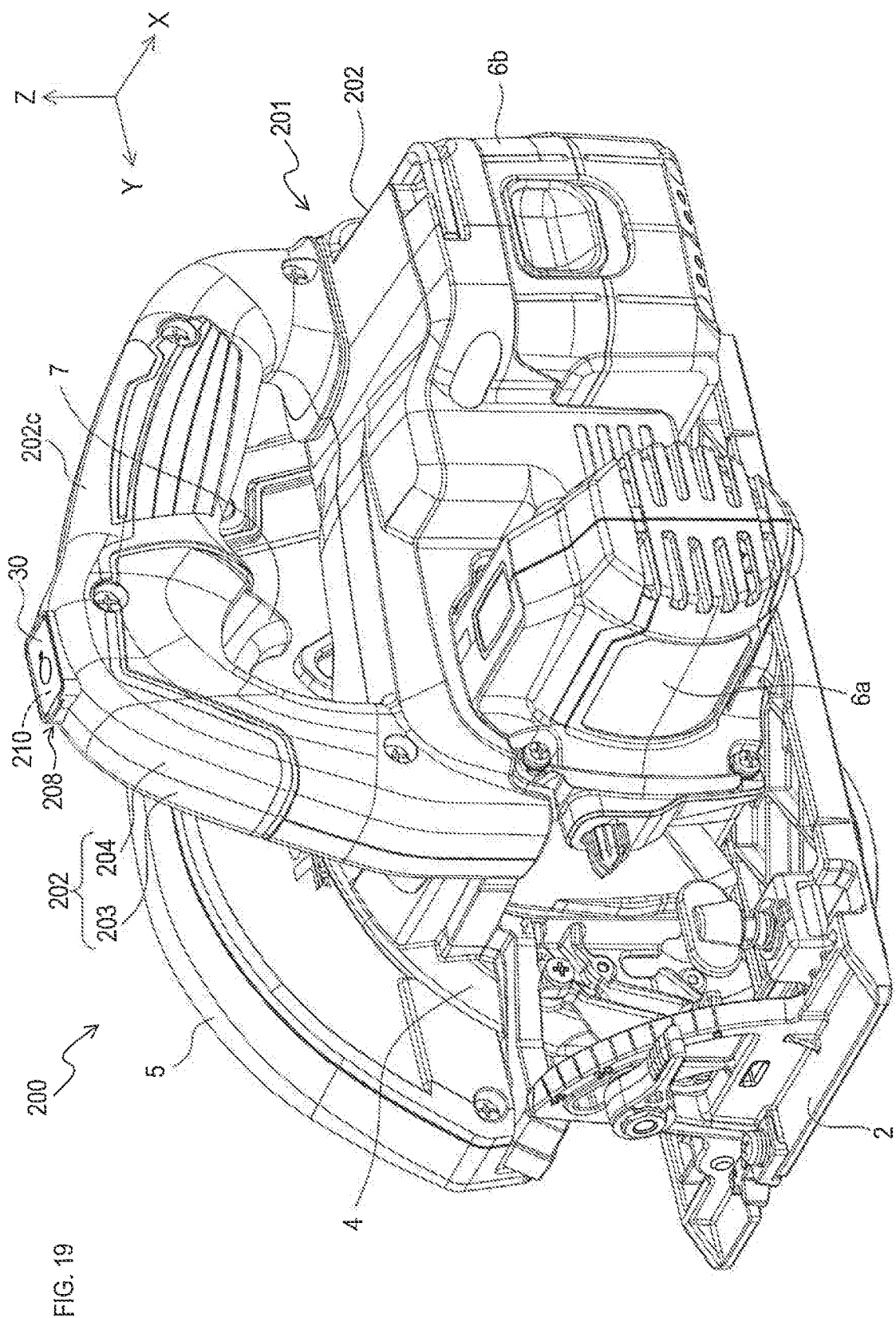
FIG. 19 is a perspective view showing another example of the electric working machine.

For example, as an electric working machine 200 shown in FIG. 19, an adapter attachment portion 208 may be provided on top side of a handle portion 202c. In the electric working machine 200 shown in FIG. 19, a main body housing 202 included in the main body 201 has the motor housing portion 6a, the controller housing portion 6b, and the handle portion 202c.

The main body housing 202 includes two half housings 203, 204 which are right and left housings. That is, as shown in FIG. 19, the main body housing 202 is formed by bringing the right half housing 203 and the left half housing 204 to face and into contact with each other.

In upper parts of the half housings 203, 204, an adapter housing portion 210 included in the adapter attachment portion 208 is divided into left and right parts. When the half housings 203, 204 are brought into contact with each other, the divided parts of the adapter housing portion 210 on the respective housings are combined to so as to form the whole adapter housing portion 210.

(2-2) It is merely an example that the number of contacts provided in the communication adapter 60 is eight, and that the number of terminals provided in the connector 14 is four. These numbers may be determined as appropriate.

In the above embodiment, the contacts out of the eight contacts of the communication adapter 60 that are actually coupled to the terminals of the connector 14 and used are the first contact 81, the fourth contact 84, the fifth contacts 85, and the eighth contact 88, but this is only an example. Which contact and how many of contacts out of the contacts provided in the communication adapter 60 are used and electrically coupled to the main body may be determined as required. For example, it is also possible to use the second contact 82 in place of the fifth contact 85.

(2-3) In the above embodiment, the communication adapter 60 of the electric working machine 1 communicates with the communication adapter 150 of the dust collector 140. However, whom the communication adapter 60 communicates with is not limited to the communication adapter 150 of the dust collector 140. For example, the communication adapter 60 may be able to mutually communicate data with various portable communication devices such as a smart phone and a laptop.

The communication adapter 60 may be not only coupled to the electric working machine 1 but may be coupled to various devices and may be able to communicate data with such devices. For example, the communication adapter 60 may be attached to a charger that can charge the battery 131, and various information such as a state or a charging state of the battery 131 may be able to be wirelessly transmitted from the communication adapter 60 to outside.

(2-4) The communication adapter 60 can be applied not only to a circular saw, but to various electric working machines such as electric power tools for gardening, masonry work, metalworking, or woodworking. More specifically, communication adapter 60 can be applied to a variety of electric working machine such as an electric hammer, an electric hammer drill, an electric drill, an electric driver, an electric wrench, an electric grinder, an electric reciprocating saw, an electric jigsaw, an electric cutter, an electric chain saw, an electric plane, an power nailer (including an electric tacker), an electric hedge trimmer, an electric lawn mower, an electric lawn trimmer, an electric grass cutter, an electric cleaner, an electric blower, an electric sprayer, an electric spreader, and an electric dust collector. The communication adapter 60 may be applied to a working machine having an engine as a drive source in place of a motor. In that case, the controller 111 may be a controller for controlling driving of the engine.

(2-5) A plurality of functions of a single component in the above embodiments may be implemented by a plurality of components, or a single function of a single component may be implementing by a plurality of components. Further, a plurality of functions of a plurality of components may be implemented by a single component, or a single function implemented by a plurality of components may be implemented by a single component. It is also possible to omit part of the configuration of the above embodiments. Further, at least part of the configuration of the above embodiments may be added to or replaced with a configuration of the other of the above embodiments. Any aspects included in the technical idea specified from language as set forth in the appended claims are embodiments of the present disclosure.

What is claimed is:

1. A working machine comprising:
   a motor;
   an outer surface;
   an adapter housing portion having an opening provided on the outer surface and being configured to accommodate a communication adapter that is detachable through the opening, the communication adapter including an adapter case and a module substrate, the adapter case having a first end, the module substrate having a leading end, the first end including a first side wall having an outer edge formed in a non-point symmetrical shape, the module substrate being accommodated in the adapter case such that the leading end protrudes from the first end, the leading end having a first surface and a second surface, the first surface and the second surface forming together a first insertion piece and a second insertion piece, the first insertion piece and the second insertion piece being separated away from each other, the first insertion piece including a first contact on the first surface, the first insertion piece including a second contact on the second surface, the second insertion piece including a third contact on the first surface, the second insertion piece including a fourth contact on the second surface;
   a connector provided in the adapter housing portion and configured to attach to the communication adapter, the connector including a connector housing, a first pair of terminals, and a second pair of terminals, the connector housing including a first opening and a slot, the first opening being an insertion opening for the communication adapter and including a second side wall that has an inner edge formed in a non-point symmetrical shape and that corresponds to the first side wall, the second side wall including a recessed edge adjacent to the first opening, the slot receiving the first insertion piece and the second insertion piece, the first pair of terminals including a first terminal and a second terminal, the second pair of terminals including a third terminal and a fourth terminal, the first terminal being configured to be electrically coupled to the first contact, the second terminal being configured to be electrically coupled to the second contact, the third terminal being configured to be electrically coupled to the third contact, the fourth terminal being configured to be electrically coupled to the fourth contact, the slot having a space therein for the first terminal, the second terminal, the third terminal, and the fourth terminal, the first terminal and the second terminal being aligned in a direction orthogonal to the module substrate and arranged such that the module substrate is arranged therebetween, the third terminal and the fourth terminal being aligned in the direction orthogonal to the module substrate and arranged such that the module substrate is arranged therebetween; and a controller electrically coupled to the connector and configured to drive the motor and transmit information to an external device via the communication adapter with the motor in operation.

2. The working machine according to claim 1,
wherein the connector includes at least one partition wall,
wherein the slot has a first space and a second space, the first space being divided from the second space by the at least one partition wall,
wherein the first terminal and the second terminal are provided in the first space, and
wherein the third terminal and the fourth terminal are provided in the second space.

3. The working machine according to claim 2,
wherein the first insertion piece is inserted to the first space, and
wherein the second insertion piece is inserted to the second space.

4. The working machine according to claim 2,
wherein the connector includes a plurality of terminals including the first pair of terminals and the second pair of terminals,
wherein only the first pair of terminals among the plurality of terminals are arranged in the first space, and
wherein only the second pair of terminals among the plurality of terminals are arranged in the second space.

5. The working machine according to claim 1,
wherein the first terminal is configured to be brought in contact with the first contact in response to the communication adapter accommodated in the adapter housing portion,
wherein the second terminal is configured to be brought in contact with the second contact in response to the communication adapter accommodated in the adapter housing portion,
wherein the third terminal is configured to be brought in contact with the third contact in response to the communication adapter accommodated in the adapter housing portion, and
wherein the fourth terminal is configured to be brought in contact with the fourth contact in response to the communication adapter accommodated in the adapter housing portion.

6. The working machine according to claim 1,
wherein the first terminal and the second terminal are configured to be closer to each other in response to the communication adapter not being accommodated in the adapter housing portion, and
wherein the third terminal and the fourth terminal are configured to be closer to each other in response to the communication adapter not being accommodated in the adapter housing portion.

7. The working machine according to claim 1,
wherein the connector housing further includes a second opening, the second opening facing the first opening, and
wherein the connector includes a bottom sealing plate configured to seal the second opening.

8. The working machine according to claim 7, further comprising:
a first lead coupled to the first terminal;
a second lead coupled to the second terminal;
a third lead coupled to the third terminal; and
a fourth lead coupled to the fourth terminal,
wherein the bottom sealing plate includes a first notch, a second notch, a third notch, and a fourth notch,
wherein the first lead is inserted to the first notch,
wherein the second lead is inserted to the second notch,
wherein the third lead is inserted to the third notch, and
wherein the fourth lead is inserted to the fourth notch.

9. The working machine according to claim 1,
wherein the outer edge includes a first part and a second part, the second part protruding outwardly of the first part, and
wherein the inner edge includes a third part and a fourth part, the third part corresponding to the first part, and the fourth part protruding outwardly of the third part and corresponding to the second part.

10. The working machine according to claim 1, further comprising a claw portion having a semicircular annular shape provided on the recessed edge.

11. A communication adapter attachment device provided to a working machine, the device comprising:
an adapter housing portion provided inside the working machine, having an opening on an outer surface of the working machine, and being configured to accommodate a communication adapter that is detachable through the opening, the communication adapter including an adapter case and a module substrate, the adapter case having a first end, the module substrate having a leading end, the first end including a first side wall having an outer edge formed in a non-point symmetrical shape, the module substrate being accommodated in the adapter case such that the leading end protrudes from the first end, the leading end having a first surface and a second surface, the first surface and the second surface forming together a first insertion piece and a second insertion piece, the first insertion piece and the second insertion piece being separated away from each other, the first insertion piece including a first contact on the first surface, the first insertion piece including a second contact on the second surface, the second insertion piece including a third contact on the first surface, the second insertion piece including a fourth contact on the second surface;
a connector provided in the adapter housing portion and configured to attach to the communication adapter, the connector including a connector housing, a first pair of terminals, and a second pair of terminals, the connector housing including a first opening and a slot, the first opening being an insertion opening for the communication adapter and including a second side wall that has an inner edge formed in a non-point symmetrical shape and that corresponds to the first side wall, the second side wall including a recessed edge adjacent to the first opening, the slot receiving the first insertion piece and the second insertion piece, the first pair of terminals including a first terminal and a second terminal, the second pair of terminals including a third terminal and a fourth terminal, the first terminal being configured to be electrically coupled to the first contact, the second terminal being configured to be electrically coupled to the second contact, the third terminal being configured to be electrically coupled to the third contact, the fourth terminal being configured to be electrically coupled to the fourth contact, the slot having a space therein for the first terminal, the second terminal, the third terminal, and the fourth terminal, the first terminal and the second terminal being aligned in a direction orthogonal to the module substrate and arranged such that the module substrate is arranged therebetween, the third terminal and the fourth terminal being aligned in a direction orthogonal to the module substrate and arranged such that the module substrate is arranged therebetween.

12. The communication adapter attachment device according to claim 11,
wherein the connector includes at least one partition wall,
wherein the slot has a first space and a second space, the first space being divided from the second space by the at least one partition wall,
wherein the first terminal and the second terminal are provided in the first space, and
wherein the third terminal and the fourth terminal are provided in the second space.

13. The communication adapter attachment device according to claim 12,
wherein the first insertion piece is inserted to the first space, and
wherein the second insertion piece is inserted to the second space.

14. The communication adapter attachment device according to claim 12,
wherein the connector includes a plurality of terminals including the first pair of terminals and the second pair of terminals,
wherein only the first pair of terminals among the plurality of terminals are arranged in the first space, and
wherein only the second pair of terminals among the plurality of terminals are arranged in the second space.

15. The communication adapter attachment device according to claim 11,
wherein the first terminal is configured to be brought in contact with the first contact in response to the communication adapter accommodated in the adapter housing portion,
wherein the second terminal is configured to be brought in contact with the second contact in response to the communication adapter accommodated in the adapter housing portion,
wherein the third terminal is configured to be brought in contact with the third contact in response to the communication adapter accommodated in the adapter housing portion, and wherein the fourth terminal is configured to be brought in contact with the fourth contact in response to the communication adapter accommodated in the adapter housing portion.

16. The communication adapter attachment device according to claim 11,
wherein the first terminal and the second terminal are configured to be closer to each other in response to the communication adapter not being accommodated in the adapter housing portion, and
wherein the third terminal and the fourth terminal are configured to be closer to each other in response to the communication adapter not being accommodated in the adapter housing portion.

17. The communication adapter attachment device according to claim 11,
wherein the connector housing further includes a second opening, the second opening facing the first opening, and
wherein the connector includes a bottom sealing plate configured to seal the second opening.

18. The communication adapter attachment device according to claim 16, a first lead coupled to the first terminal;
a second lead coupled to the second terminal;
a third lead coupled to the third terminal; and
a fourth lead coupled to the fourth terminal,
wherein the bottom sealing plate includes a first notch, a second notch, a third notch, and a fourth notch,
wherein the first lead is inserted to the first notch,
wherein the second lead is inserted to the second notch,
wherein the third lead is inserted to the third notch, and
wherein the fourth lead is inserted to the fourth notch.

19. The communication adapter attachment device according to claim 11,
wherein the outer edge includes a first part and a second part, the second part protruding outwardly of the first part, and
wherein the inner edge includes a third part and a fourth part, the third part corresponding to the first part, and the fourth part protruding outwardly of the third part and corresponding to the second part.

20. The communication adapter attachment device according to claim 11, further comprising a claw portion having a semicircular annular shape provided on the recessed edge.

21. A communication adapter attachment device provided to a working machine, the device comprising:
an adapter housing portion provided inside the working machine, having an opening on an outer surface of the working machine, and being configured to accommodate a communication adapter that is detachable through the opening, the communication adapter including an adapter case and a module substrate, the adapter case having a first end, the first end including a first side wall having an outer shape, the outer shape including a first half with a first maximum width in a first direction and a second half with a second maximum width in the first direction, the first maximum width being shorter than the second maximum width, the module substrate having a leading end, the module substrate being accommodated in the adapter case such that the leading end protrudes from the first end, the leading end having a first surface and a second surface, the first surface and the second surface forming together a first insertion piece and a second insertion piece, the first insertion piece and the second insertion piece being separated away from each other, the first insertion piece including a first contact on the first surface, the first insertion piece including a second contact on the second surface, the second insertion piece including a third contact on the first surface, the second insertion piece including a fourth contact on the second surface; and a connector provided in the adapter housing portion and configured to attach to the communication adapter, the connector including a connector housing, a first pair of terminals, and a second pair of terminals, the connector housing including a first opening and a slot, the first opening being an insertion opening for the communication adapter and including a second side wall, the second side wall including a recessed edge adjacent to the first opening, the second side wall having an inner shape including a third half with a third maximum width in the first direction and a fourth half with a fourth maximum width in the first direction, the third maximum width being shorter than the fourth maximum width, the first maximum width corresponding to the third maximum width, the second maximum width corresponding to the fourth maximum width, the slot receiving the first insertion piece and the second insertion piece, the first pair of terminals including a first terminal and a second terminal, the second pair of terminals including a third terminal and a fourth terminal, the first terminal being configured to be electrically coupled to the first contact, the second terminal being configured to be electrically coupled to the second contact, the third terminal being configured to be electrically coupled to the third contact, the fourth terminal being configured to be electrically coupled to the fourth contact, the slot having a space therein for the first terminal, the second terminal, the third terminal, and the fourth terminal, the first terminal and the second terminal being aligned in a direction orthogonal to the module substrate and arranged such that the module substrate is arranged therebetween, the third terminal and the fourth terminal being aligned in the direction orthogonal to the module substrate and arranged such that the module substrate is arranged therebetween.

22. A working machine comprising:

a motor;

an outer surface;

an adapter housing portion having an opening provided on the outer surface and being configured to accommodate a communication adapter that is detachable through the opening, the communication adapter including an adapter case and a module substrate, the adapter case having a first end, the module substrate having a leading end, the first end including a first side wall, the module substrate being accommodated in the adapter case such that the leading end protrudes from the first end, the leading end having a first surface and a second surface, the first surface and the second surface forming together a first insertion piece and a second insertion piece, the first insertion piece and the second insertion piece being separated away from each other, the first insertion piece including a first contact on the first surface, the first insertion piece including a second contact on the second surface, the second insertion piece including a third contact on the first surface, the second insertion piece including a fourth contact on the second surface;

a connector provided in the adapter housing portion and configured to attach to the communication adapter, the connector including a connector housing, a first pair of terminals, and a second pair of terminals, the connector housing including a first opening and a slot, the first opening being an insertion opening for the communication adapter and including a second side wall that corresponds to the first side wall, the second side wall including a recessed edge adjacent to the first opening, the slot receiving the first insertion piece and the second insertion piece, the first pair of terminals including a first terminal and a second terminal, the second pair of terminals including a third terminal and a fourth terminal, the first terminal being configured to be electrically coupled to the first contact, the second terminal being configured to be electrically coupled to the second contact, the third terminal being configured to be electrically coupled to the third contact, the fourth terminal being configured to be electrically coupled to the fourth contact, the slot having a space therein for the first terminal, the second terminal, the third terminal, and the fourth terminal; and a controller electrically coupled to the connector and configured to drive the motor and transmit information to an external device via the communication adapter with the motor in operation.

\* \* \* \* \*